(12) United States Patent
Siddiqui et al.

(10) Patent No.: US 8,229,212 B2
(45) Date of Patent: Jul. 24, 2012

(54) INTERPOLATION SYSTEM AND METHOD

(75) Inventors: Hasib Ahmed Siddiqui, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 988 days.

(21) Appl. No.: 12/206,904

(22) Filed: Sep. 9, 2008

(65) Prior Publication Data
US 2009/0252411 A1 Oct. 8, 2009

Related U.S. Application Data

(60) Provisional application No. 61/043,315, filed on Apr. 8, 2008.

(51) Int. Cl.
G06K 9/20 (2006.01)
H04N 9/45 (2006.01)
H04N 9/64 (2006.01)

(52) U.S. Cl. ........ 382/162; 382/165; 382/167; 382/300; 348/265; 348/271; 348/272; 348/273; 348/279; 348/280

(58) Field of Classification Search .................. 382/162, 382/165, 167, 300; 348/265, 271, 273, 279, 348/280, 272
See application file for complete search history.

(56) References Cited

U.S. PATENT DOCUMENTS

| | | | | |
|---|---|---|---|---|
| 4,630,307 A | * | 12/1986 | Cok ............................... | 382/165 |
| 5,382,976 A | * | 1/1995 | Hibbard ......................... | 348/273 |
| 6,816,197 B2 | | 11/2004 | Keshet et al. | |
| 6,882,365 B1 | * | 4/2005 | Aoki ............................... | 348/273 |
| 7,333,678 B1 | * | 2/2008 | Huang et al. .................... | 382/300 |
| 7,362,897 B2 | * | 4/2008 | Ishiga ............................. | 382/167 |
| 7,366,351 B2 | * | 4/2008 | Walmsley et al. ............. | 382/167 |
| 7,554,583 B2 | * | 6/2009 | Kuno et al. ..................... | 348/241 |
| 7,576,783 B2 | * | 8/2009 | Hwang et al. ............... | 348/222.1 |
| 2005/0146629 A1 | * | 7/2005 | Muresan ........................ | 348/280 |
| 2005/0169521 A1 | | 8/2005 | Hel-Or | |
| 2007/0159544 A1 | | 7/2007 | Hu | |
| 2008/0056618 A1 | * | 3/2008 | Yoshino et al. ................ | 382/300 |
| 2009/0066821 A1 | * | 3/2009 | Achong et al. ................. | 348/273 |

FOREIGN PATENT DOCUMENTS

| | | |
|---|---|---|
| EP | 1288855 A2 | 3/2003 |
| EP | 1643441 A1 | 4/2006 |

OTHER PUBLICATIONS

Aleksci, et al. "Local Correlation Based CFA Interpolation." Electrical and Computer Engineering, 2004. Canadian Conference on . 2. (2004): 793-796. Print.*
Li, et al. "New Edge-Directed Interpolation." IEEE Transactions on Image Processing. 10.10 (2001): 1521-1527. Print.*

(Continued)

*Primary Examiner* — Michael A Newman
(74) *Attorney, Agent, or Firm* — Matthew J. Evans; Ashish L. Patel

(57) ABSTRACT

Interpolations systems and methods are disclosed. In a particular embodiment, a system is disclosed that includes an input to receive image data. The system also includes an image processing system responsive to the image data and including a demosaicing module. The demosaicing module is configured to use adaptive bi-cubic spline interpolation. The system further includes an output responsive to the image processing system and adapted to provide output data.

26 Claims, 13 Drawing Sheets

OTHER PUBLICATIONS

International Search Report and Written Opinion—PCT/US2009/039554—International Search Authority—European Patent Office, Sep. 7, 2009.

J. Adams and J. Hamilton. Design of practical color filter array interpolation algorithms for digital cameras. Proc. SPIE, 3028:117-125, 1997.

B. Guntruk, J. Glotzbach, Y. Altunbasak, R. Schafer, and R. Mersereau. Demosaicking: color filter array interpolation. IEEE Signal Processing Magazine, pp. 44-54, Jan. 2005.

K. Hirakawa and T. Parks. Adaptive homogeneity-directed demosaicing algorithm. In Proc. IEEE Int. Conf. Image Processing, pp. 669-672, 2003.

R. Kimmel. Demosaicing: image reconstruction from ccd samples. IEEE Trans. Image Processing, 8(9):1221-1228, 1999.

B. Kolpatzik and C. Bouman. Optimal universal color palette design for error diffusion. J. Electronic Imaging, 4 (2):131-143, Apr. 1995.

R. Ramanath, W.E. Snyder, and G.L. Bilbro, Demosaicking methods for bayer color arrays. J. Electronic Imaging, 11:306-315, Jul. 2002.

B. Tao, I. Tasl, T. Cooper, M. Blasgen, and E. Edwards. Demosaicing using human visual properties and wavelet interpolation filtering, Color Imaging Conf.: Color Science, Systems, Applications., pp. 252-256, 1999.

C. Tomasi and R. Manduchi. Bilateral filtering for gray and color images. Proc. IEEE International Conference on Computer Vision, 1998.

Ramanath, Rajeev et al., Adaptive Demosaicking. Journal of Electronic Imaging 12(4), pp. 633-642. Oct. 2003.

* cited by examiner

INTERPOLATION SYSTEM AND METHOD

CROSS-REFERENCE TO RELATED APPLICATIONS

The present Application for Patent claims priority benefit of commonly-assigned Provisional Application Ser. No. 61/043,315 filed Apr. 8, 2008. This provisional patent application is hereby expressly incorporated by reference herein.

BACKGROUND

I. Field

The present disclosure is generally related to interpolation systems and methods.

II. Description of Related Art

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

Demosaicing is an example of a function that may be performed by such processing devices. Digital cameras, including still cameras and video cameras, often use a single-chip image sensor covered with a mosaic of red, green, and blue color filters for capturing the color information. At each pixel location, only one of the three color values may be known. Demosaicing generally refers to interpolating missing color values at one or more pixel locations to estimate red, green, and blue color channels.

SUMMARY

In a particular embodiment, an method to interpolate missing green pixel values in a color filter array image is disclosed. A fast interpolation algorithm is used to obtain first order estimates of unknown green pixel values. The initial estimate of the green channel is refined through a spatially adaptive non-linear filter, referred to herein as the adaptive bi-cubic spline interpolator. After the green channel has been estimated, red and blue pixels are estimated using the interpolation of the difference (or chrominance) channels. A demosaic performance has been evaluated on a wide range of test images using subjective as well as objective measures of image quality. The experimental results demonstrate significantly improved image quality over other demosaic methods.

In another particular embodiment, a system is disclosed that includes an input to receive image data. The system also includes an image processing system responsive to the image data and including a demosaicing module. The demosaicing module is configured to use adaptive bi-cubic spline interpolation. The system further includes an output responsive to the image processing system and adapted to provide output data.

In another particular embodiment, an interpolation system is disclosed that includes an interpolation filter configured to receive first color data and including adaptive bi-cubic spline interpolation logic configured to perform an interpolation operation using a rotated weighting grid. The first color data represents a first color of input image data. The input image data further includes second color data representing a second color and third color data representing a third color. The first color appears more frequently in the input image data than the second color and the third color.

In another particular embodiment, a method is disclosed that includes receiving image data including first color data representing a first color, second color data representing a second color, and third color data representing a third color. The image data includes more of the first color data than the second color data and the third color data. The method also includes generating fourth color data that represents a fourth color by subtracting interpolated second color data from the first color data. The method includes interpolating the fourth color data to generate interpolated fourth color data. The method further includes generating interpolated first color data using the interpolated fourth color data added to the second color data.

In another particular embodiment, a processor readable medium storing processor instructions is disclosed. The processor instructions include instructions executable by the processor to receive image data including first color data representing a first color, second color data representing a second color, and third color data representing a third color. The processor instructions also include instructions executable by the processor to generate interpolated second color data. The processor instructions also include instructions executable by the processor to subtract the interpolated second color data from the first color data to generate fourth color data representing a fourth color. The processor instructions include instructions executable by the processor to interpolate the fourth color data to generate interpolated fourth color data using an adaptive bi-cubic spline interpolation operation. The processor instructions further include instructions executable by the processor to add the second color data to the interpolated fourth color data to produce interpolated first color data and to store the interpolated first color data to a memory.

One particular advantage provided by embodiments of the interpolation system and method is improved demosaicing of image data that can be performed on a wireless device with limited processing resources.

Other aspects, advantages, and features of the present disclosure will become apparent after review of the entire application, including the following sections: Brief Description of the Drawings, Detailed Description, and the Claims.

DETAILED DESCRIPTION

Figure 1:
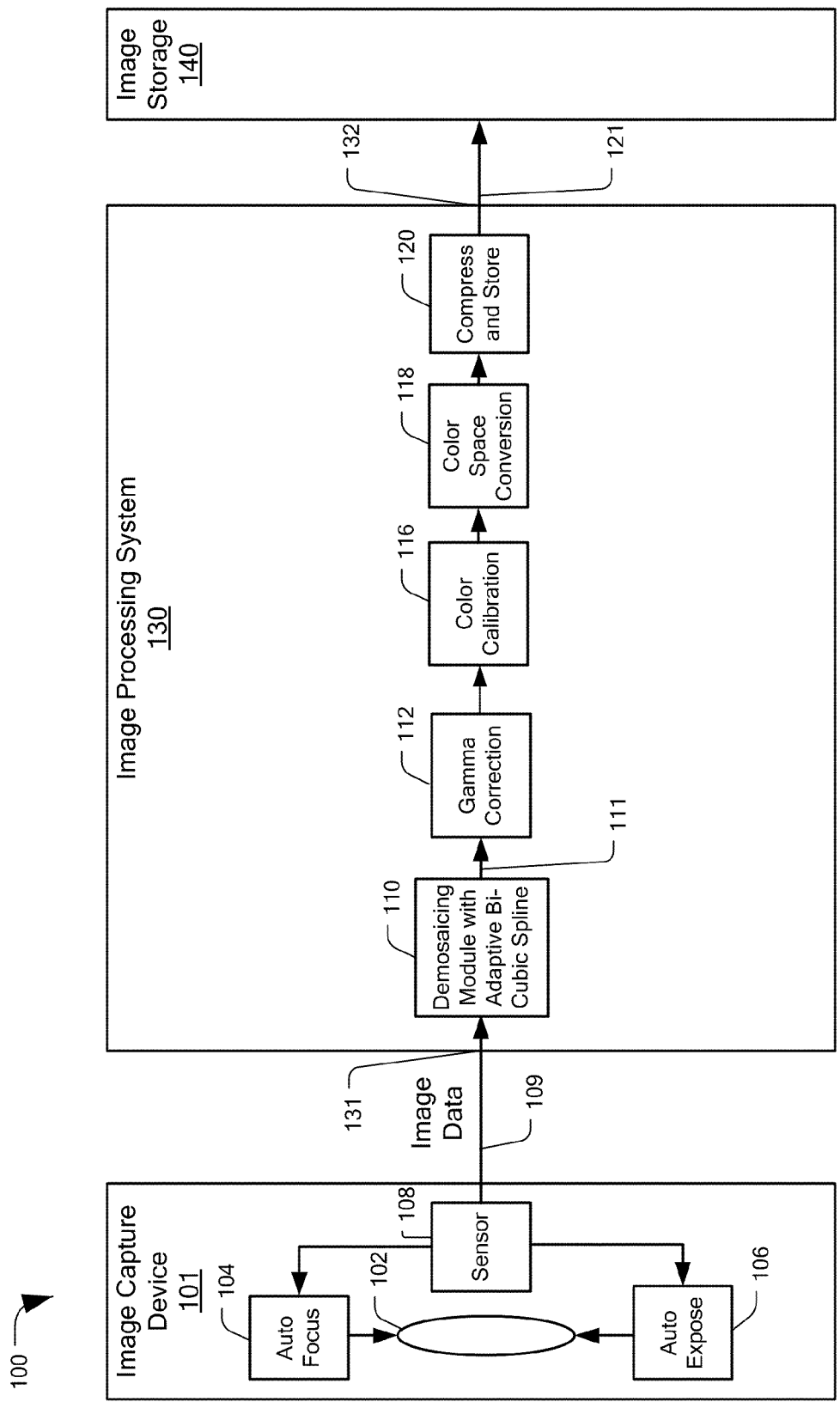
FIG. 1 is a block diagram of a particular illustrative embodiment of a system including an image processing system having a demosaicing module with adaptive bi-cubic spline.

Referring to FIG. 1, a particular illustrative embodiment of a system including an image processing system having a demosaicing module with adaptive bi-cubic spline is depicted and generally designated 100. The system 100 includes an image capture device 101 coupled to an image processing system 130. The image processing system 130 is coupled to an image storage device 140. The image processing system 130 is configured to receive image data 109 from the image capture device 101 and to perform a demosaicing operation to interpolate color data that is missing from individual pixels of the image data 109. Generally, the system 100 may be implemented in a portable electronic device configured to perform real-time image processing using relatively limited processing resources.

In a particular embodiment, the image capture device 101 is a camera, such as a video camera or a still camera. The image capture device 101 includes a lens 102 that is responsive to a focusing module 104 and to an exposure module 106. A sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image. In a particular embodiment, the sensor 108 may include multiple detectors that are arranged so that adjacent detectors detect different colors of light. For example, received light may be filtered so that each detector receives red, green, or blue incoming light.

The image capture device 101 is coupled to provide the image data 109 to an input 131 of the image processing system 130. The image processing system 130 is responsive to the image data 109 and includes a demosaicing module configured to use adaptive bi-cubic spline interpolation 110. The image processing system 130 also includes a gamma module 112 to generate gamma corrected data from data 111 that is received from the demosaicing module configured to use adaptive bi-cubic spline interpolation 110. A color calibration module 116 is coupled to perform a calibration on the gamma corrected data. A color space conversion module 118 is coupled to convert an output of the color calibration module 116 to a color space. A compress and store module 120 is coupled to receive an output of the color space conversion module 118 and to store compressed output data 121 to the image storage device 140. An output 132 responsive to the image processing system 130 is adapted to provide the output data 121 to the image storage device 140.

The image storage device 140 is coupled to the output 132 and is adapted to store the output data 121. The image storage device 140 may include any type of storage medium, such as one or more display buffers, registers, caches, Flash memory elements, hard disks, any other storage device, or any combination thereof.

During operation, the demosaicing module configured to use adaptive bi-cubic spline interpolation 110 may efficiently perform demosaicing of the input image data 109. As will be discussed in detail, demosaicing using adaptive bi-cubic spline interpolation enables accurate reconstruction of the color channels associated with the image with relatively little aliasing or other high-frequency artifacts at a portable processing device.

Figure 2:
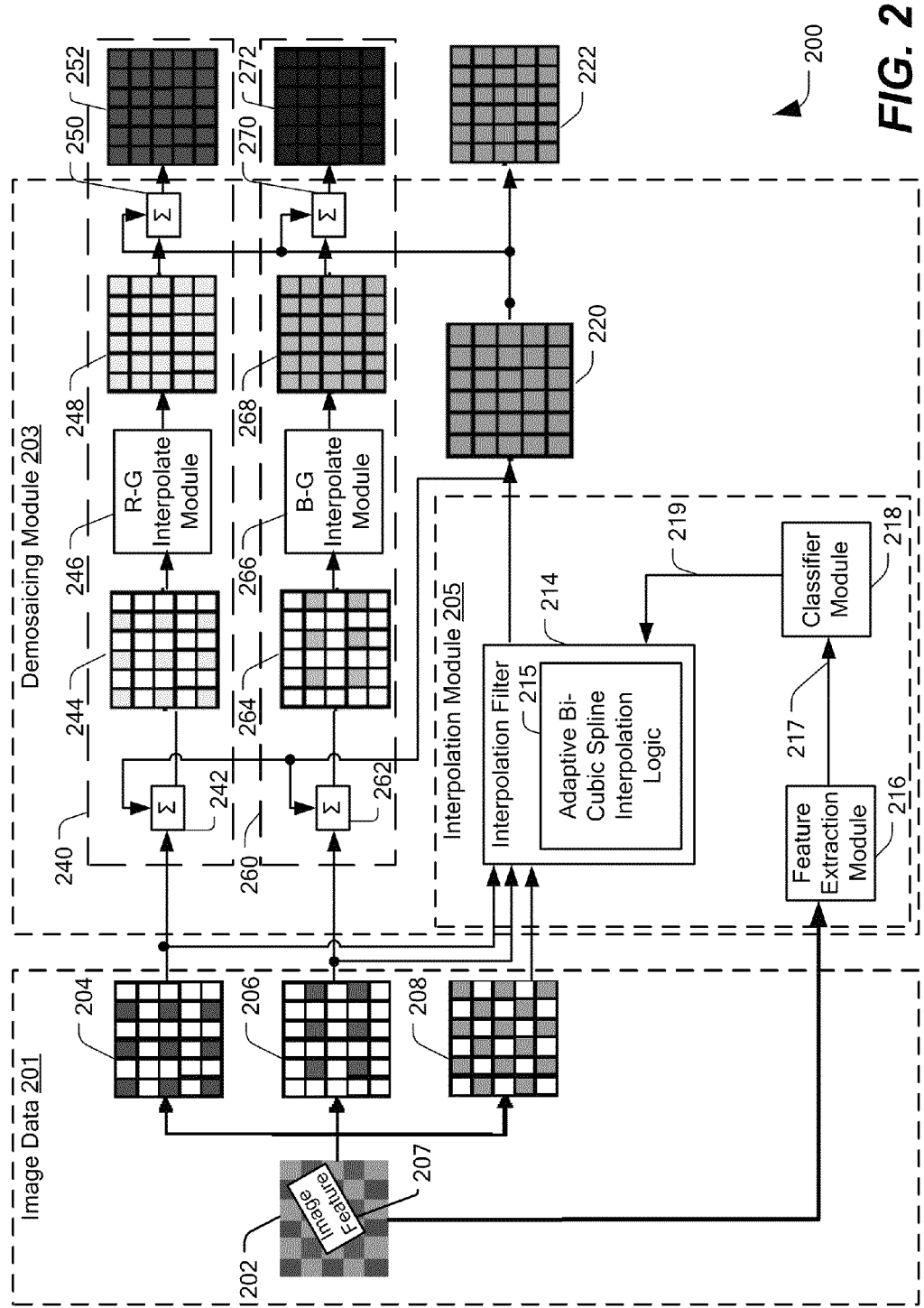
FIG. 2 is a block diagram of a particular illustrative embodiment of a system including a demosaicing module with adaptive bi-cubic spline interpolation logic.

Referring to FIG. 2, a particular illustrative embodiment of a system including demosaicing module with adaptive bi-cubic spline interpolation logic is depicted and generally designated 200. A demosaicing module 203 is coupled to receive image data 201 and to produce reconstructed image data. In a particular embodiment, the demosaicing module 203 may correspond to the demosaicing module configured to use adaptive bi-cubic spline interpolation 110 depicted in FIG. 1.

In a particular embodiment, the image data 201 includes mosaic image data 202 that includes first color data 208 representing a first color, second color data 204 representing a second color, and third color data 206 representing a third color. The first color data 208 may have pixel values that indicate intensity levels of the first color at alternating pixels of the mosaic image data 202. The second color data 204 may have pixel values that indicate intensity levels of the second color at the remaining pixels of odd-numbered columns of the mosaic image data 202, and the third color data 206 may have pixel values that indicate intensity levels of the third color at the remaining pixels of even-numbered columns of the mosaic image data 202. As depicted, the first color appears more frequently in the input image data 201 than the second color and the third color. In a particular embodiment, the mosaic image data 202 corresponds to a Bayer mosaic pattern where the first color is green, the second color is red, and the third color is blue, and each two-pixel-by-two-pixel portion of the mosaic image data 202 includes two green pixels, one red pixel, and one blue pixel.

The demosaicing module 203 includes an interpolation module 205 having an interpolation filter 214 that is configured to receive the input image data 201 and to output filtered data including interpolated first color data 220. In a particular embodiment, the interpolation filter 214 is adapted to use adaptive bi-cubic spline interpolation logic 215 to perform adaptive bi-cubic spline interpolation of fourth color data representing a fourth color, as is discussed with respect to FIG. 3. The interpolation module 205 also includes a feature extraction module 216 adapted to process the input image data 201 and to generate feature data 217 corresponding to detectable elements of the image data, such as a representative image feature 207. The feature extraction module 216 provides the feature data 217 to a classifier module 218 that is responsive to the feature data 217 to determine a classification of the image feature 207 based on the feature data 217. For example, the classifier module 218 may determine whether the image feature 207 is generally horizontal, vertical, or at some other orientation, on a pixel-by-pixel basis, and may generate a classifier output 219 associated with an orientation of the image feature 207. The interpolation filter 214 may be configured to use the classifier output 219 to adaptively interpolate a value of a particular pixel using values of neighboring pixels by generally determining an importance of, or similarity between, the particular pixel and its neighboring pixels based on the classifier output 219.

The demosaicing module 203 includes a first difference channel 240 coupled to receive the interpolated first color data 220 from the interpolation filter 214 and configured to provide first difference channel output data 252 corresponding to the second color. The first difference channel 240 includes an adder 242 that is configured to subtract the interpolated first color data 220 from the second color data 204. Specifically, the adder 242 may reduce each pixel value corresponding to the second color with the corresponding pixel value from the interpolated first color data 220, to generate first difference data 244. For example, where the first color is green and the second color is red, the difference is expressed as R–G. An interpolation module 246 interpolates missing pixel values of the first difference data 244 (i.e., values of pixels not corresponding to the second color) to generate interpolated first difference data 248. An adder 250 adds the interpolated first data 220 to the interpolated first difference data 248 to generate the first difference channel output data 252.

The demosaicing module 203 also includes a second difference channel 260 coupled to receive the interpolated first color data 220 from the interpolation filter 214 and configured to provide second difference channel output data 272 corresponding to the third color. The second difference channel 260 includes an adder 262 that is configured to subtract the interpolated first color data 220 from the third color data 206. Specifically, the adder 262 may reduce each pixel value corresponding to the third color with the corresponding pixel value from the interpolated first color data 220, to generate second difference data 264. For example, where the first color is green and the third color is blue, the difference is expressed as B–G. An interpolation module 266 interpolates missing pixel values of the second difference data 264 (i.e., values of pixels not corresponding to the third color) to generate interpolated second difference data 268. An adder 270 adds the interpolated first data 220 to the interpolated second difference data 268 to generate the second difference channel output data 272.

The demosaicing module 203 outputs the interpolated first color data 220 as interpolated first color output data 222. The interpolated first color output data 222, in addition to the first difference channel output data 252 and the second difference channel output data 272, are provided by the demosaicing module 203 a result of a demosaicing operation on the input image data 201.

Although the interpolation module 205 uses adaptive bi-cubic spline interpolation logic 215, in a particular embodiment, the difference channel interpolation modules 246 and 266 do not use adaptive bi-cubic spline interpolation and may instead implement an interpolation algorithm that uses fewer computations, such as a linear or bilinear interpolation.

Although the difference channels 240 and 260 are depicted as including separate components, one or more components may be common to the difference channels 240 and 260. For example the interpolation modules 246 and 266 may be implemented as a single circuitry component, firmware component, or processor operation configured to perform interpolation on both of the first difference data 244 and the second difference data 264, as non-limiting examples. Any three-color mosaic data can be used: for example, where mosaic image data 202 corresponds to a Bayer mosaic pattern where the first color is green, the second color is red (or blue), and the third color is blue (or red), the fourth color used by the interpolation filter 214 may be yellow or cyan; as another example, for a cyan-magenta-yellow (CMY) mosaic pattern where the first color is yellow, the second color is magenta (or cyan), and the third color is cyan (or magenta), the fourth color may be red or blue. Although described for illustrative purposes using three colors, in other embodiments the system 200 may perform demosaicing on image data that may include any number of colors or non-color components. Examples of four-color mosaic image data systems that may be operated on by the system 200 include red-green-blue-emerald (RGBE), cyan-yellow-green-magenta (CYGM), and red-green-blue-white (or luminance or panchromatic) (RGBW), as illustrative, non-limiting examples.

Figure 3:
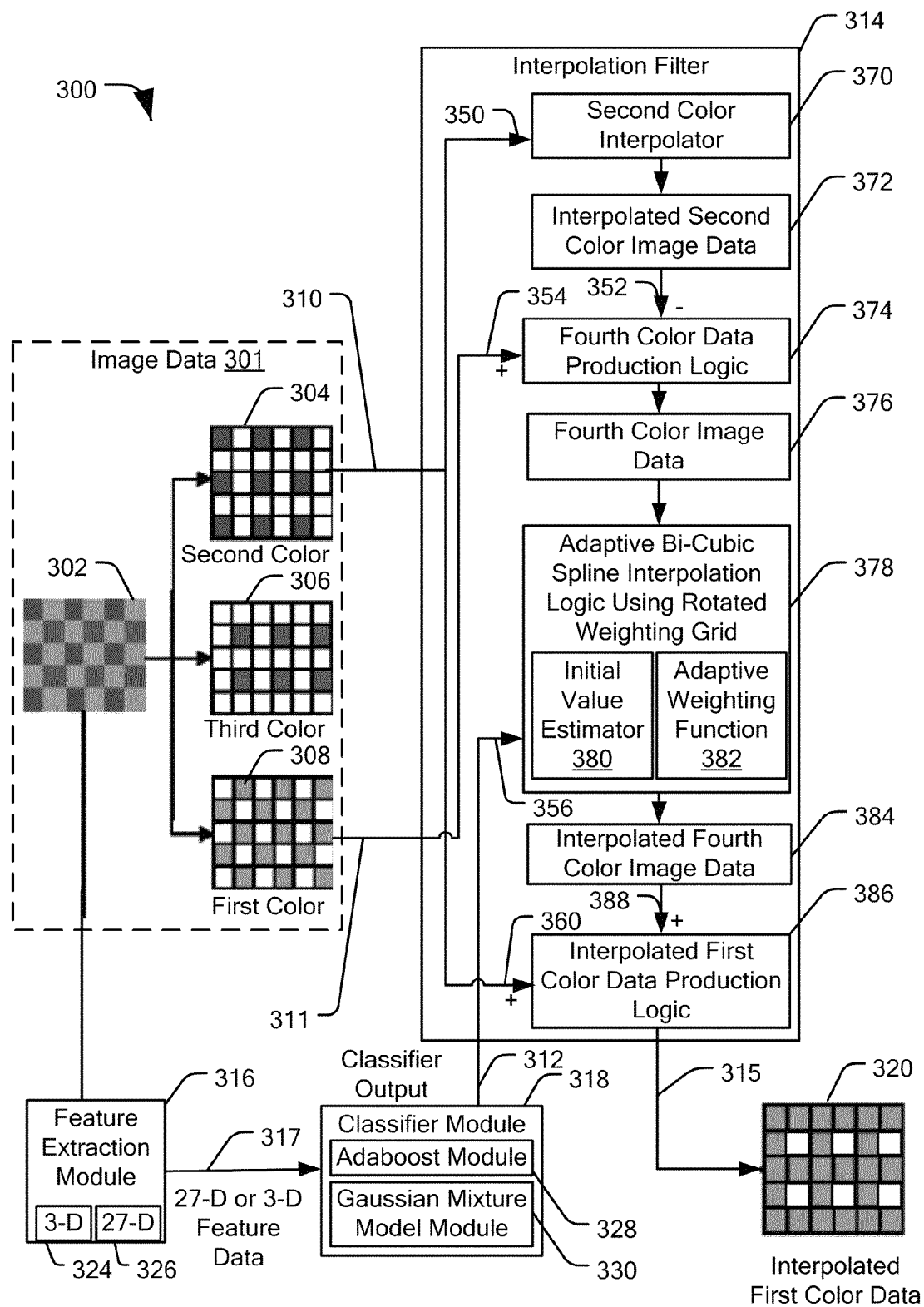
FIG. 3 is a block diagram of a first particular illustrative embodiment of a system including an interpolation filter with adaptive bi-cubic spline interpolation logic.

Referring to FIG. 3, a first particular illustrative embodiment of a system including an interpolation filter with adaptive bi-cubic spline interpolation logic is depicted and generally designated 300. An interpolation filter 314 and a feature extraction module 316 are each configured to receive image data 301. A classifier module 318 is adapted to receive feature data 317 from the feature extraction module 316 and to provide a classifier output 312 to the interpolation filter 314. The interpolation filter 314 is configured to generate an output 315 including interpolated first color data 320 based the image data 301 and using the classifier output 312 with adaptive bi-cubic spline interpolation.

In a particular embodiment, the interpolation filter 314, the feature extraction module 316, and the classifier module 318 may be implemented in the demosaicing module configured to use adaptive bi-cubic spline interpolation 110 depicted in FIG. 1. In another embodiment, elements of the system 300 may be incorporated in the demosaicing module 203 depicted in FIG. 2. For example, the interpolation filter 314 may correspond to the interpolation filter 214, the feature extraction module 316 may correspond to the feature extraction module 216, the classifier module 318 may correspond to the classifier module 218, or any combination thereof.

As illustrated, the image data 301 includes mosaic image data 302 that is separable into first color data 308 representing a first color, second color data 304 representing a second color, and third color data 306 representing a third color. The first color may appear more frequently in the image data 301 than the second color and the third color. For example, the mosaic image data 302 may include Bayer mosaic data, such as discussed with respect to FIG. 2. The second color data 304 may be provided at a first input 310 of the interpolation filter 314 and the first color data may be provided at a second input 311 of the interpolation filter 314.

At the interpolation filter 314, the second color data 304 is received at an input 350 of a second color interpolator 370 that includes logic to interpolate the second color data 304 to generate interpolated second color image data 372. The second color image data 372 is provided at a negating input 352 to fourth color data production logic 374. The fourth color data production logic 374 also receives the first color data 308 at an input 354. The fourth color data production logic 374 is configured to subtract the interpolated second color image data 372 from the first color data 308 to generate fourth color image data 376. In an illustrative embodiment, where the first color is green, the second color is red, and the third color is blue, the fourth color is yellow. In another illustrative embodiment, where the first color is green, the second color is blue, and the third color is red, the fourth color is cyan. In another illustrative embodiment, where the first color is yellow, the second color is magenta, and the third color is cyan, the fourth color is red. In yet another illustrative embodiment, where the first color is yellow, the second color is cyan, and the third color is magenta, the fourth color is blue.

The fourth color image data 376 is provided to adaptive bi-cubic spline interpolation logic, such as an adaptive bi-cubic spline interpolation logic using rotated weighting grid 378, that is configured to receive the fourth color image data 376 and to generate interpolated fourth color image data 384.

In a particular embodiment, the interpolated fourth color image data 384 is provided to a first input 388 of interpolated first color data production logic 386. The second color data 304 is provided to a second input 360 of the interpolated first color data production logic 386. The interpolated first color data production logic 386 is configured to add the second color data 304 to the interpolated fourth color image data 384 to produce the interpolated first color data 320.

The feature extraction module 316 is configured to perform derivative operations associated with the input image data 301. For example, the feature extraction module 316 may be configured to receive the input image data 301 and to output feature data 317 associated with directional derivatives of the input image data 301. The feature data 317 may include a multidimensional feature vector including local directional derivatives. For example, in a particular embodiment, the feature data 317 includes three dimensional data 324 having values of three directional derivative operations. In another particular embodiment, the feature data 317 includes twenty-seven dimensional data 326 having values of twenty-seven directional derivative operations.

In a particular embodiment, the classifier module 318 may be configured to receive the feature data 317 and to generate the classifier output 312 associated with an orientation of an image feature of the input image data 301. The classifier module 318 may be configured to implement one or more classification algorithms, such as by using an Adaboost module 328 or a Gaussian mixture model module 330. For example, where the feature data 317 includes a multidimensional feature vector, the classifier module 318 may be adapted to use the multidimensional feature vector in a Gaussian mixture model type algorithm or an Adaboost type algorithm. As an illustrative, non-limited example, the classifier module 318 may be configured to selectively determine the classifier output 312 using a Gaussian mixture model type algorithm when the feature data 317 includes the three dimensional data 324 or using an Adaboost type algorithm when the feature data 317 includes the twenty-seven dimensional data 326.

In a particular embodiment, the adaptive bi-cubic spline interpolation logic 378 is configured to receive the classifier output 312 at an input 356. The adaptive bi-cubic spline interpolation logic 378 includes an initial value estimator module 380 that is configured to generate an initial value of the interpolated fourth color data 384 using the classifier output 312. The initial value estimator module 380 may be configured to estimate an initial value at a particular location of the input image data by applying the classifier output 312 to values at locations neighboring the particular location. For example, where the classifier output 312 indicates that the image has a vertical feature at a particular pixel, the image may be assumed to be slowly varying in the vertical direction but quickly varying in the horizontal direction at or near the particular pixel. Thus, the initial estimated value of that particular pixel may be more strongly based on values of one or more vertically neighboring pixels than values of horizontally neighboring pixels.

The adaptive bi-cubic spline interpolation logic 378 is configured to interpolate the fourth color data 376 using the initial value and an adaptive weighting function module 382. The adaptive weighting function module 382 may be adapted to generate an interpolated value at a particular location using a discounted value of a nearby location by applying a weighting function to a difference between the value of the nearby location and the initial value. In a particular embodiment, the weighting function includes an exponentiation to a power of four of the difference between the value of the nearby location and the initial value.

In a particular embodiment, the adaptive bi-cubic spline interpolation logic 378 determines a value of a pixel of the interpolated fourth color image data 384, designated pixel $Y_{i,j}$:

$$Y_{i,j} = \frac{1}{c_{i,j}} \sum_{k,l \in S} s_{k,l} g(|Y_{k,l} - \tilde{Y}_{i,j}|) Y_{k,l}$$

where $$s_{k,l} \in \{a^2, ab, b^2\}, \; c_{i,j} = \sum_{k,l \in S} s_{k,l} g(|Y_{k,l} - \tilde{Y}_{i,j}|),$$

where $\tilde{Y}_{i,j}$ is the initial estimate of $Y_{i,j}$; $a^2$, $ab$, and $b^2$ are weighting values applied using the rotated weighting grid to pixels of set of nearest neighbors pixels S, as will be discussed further with respect to FIG. 5; and g(x) is a non-increasing function of x, such as:

$$g(x) = \frac{1}{1 + \left(\frac{x}{16}\right)^4}$$

An initial estimate of $Y_{i,j}$ may be determined as:

$$\tilde{Y}_{i,j} = \alpha \left( \frac{Y_{i-1,j2} + Y_{i+1,j}}{2} \right) + (1-\alpha) \left( \frac{Y_{i,j-1} + Y_{i,j+1}}{2} \right), \; \alpha \in [0,1]$$

where α is a value of the classifier output 312.

As illustrated, the interpolated first color data 320 does not include interpolated values for pixels in the third color data 306, indicated as white squares in the interpolated first color data 320. However, in an alternative embodiment, values of the first color data 320 corresponding to the pixels of the third color data 306 may be generated at the interpolated first color data production logic 386, such as by using average values of nearest neighbors of the interpolated first color data 320, which may not be as accurate as other pixels of the interpolated first color data 320. However, such reduced accuracy may be sufficient for many applications, such as a camera image preview or viewfinder application at a wireless device with lowered display resolution and where higher processing speeds are desirable. Another embodiment of a system that generates more accurate interpolated first color data by using both the second color data and the third color data is depicted in FIG. 4.

Figure 4:
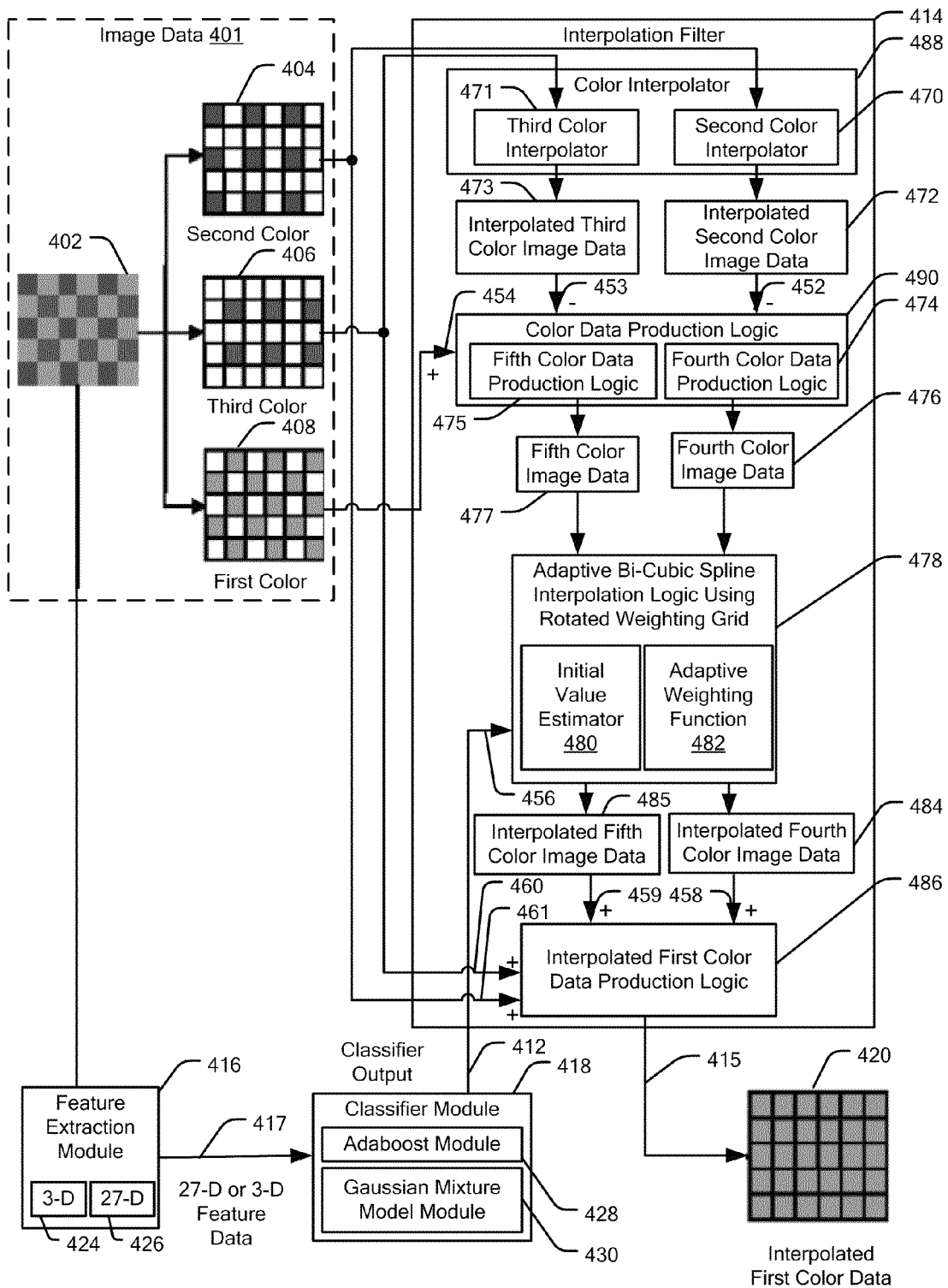
FIG. 4 is a block diagram of a second particular illustrative embodiment of a system including an interpolation filter with adaptive bi-cubic spline interpolation logic.

Referring to FIG. 4, a second particular illustrative embodiment of a system including an interpolation filter with adaptive bi-cubic spline interpolation logic is depicted and generally designated 400. The system 400 generally corresponds to the system 300 depicted in FIG. 3 modified to generate interpolated first color data using the first, second, and third color data. An interpolation filter 414 and a feature extraction module 416 are each configured to receive image data 401. A classifier module 418 is adapted to receive feature data 417 from the feature extraction module 416 and to provide a classifier output 412 to the interpolation filter 414. The interpolation filter 414 is configured to generate an output 415 including interpolated first color data 420 based the image data 401 and using the classifier output 412 with adaptive bi-cubic spline interpolation.

As illustrated, the image data 401 includes mosaic image data 402 that is separable into first color data 408 representing a first color, second color data 404 representing a second color, and third color data 406 representing a third color. The first color may appear more frequently in the image data 401 than the second color and the third color. For example, the mosaic image data 402 may include Bayer mosaic data, such as discussed with respect to FIG. 2.

The second color data 404 and the third color data 406 are received at a color interpolator 488 of the interpolation filter 414. In a particular embodiment, the color interpolator 488 includes a second color interpolator 470 that includes logic to interpolate the second color data 404 to generate interpolated second color image data 472. The color interpolator 488 may also include a third color interpolator 471 that includes logic to interpolate the third color data 406 to generate interpolated third color image data 473.

The interpolated second color image data 472 is provided at a negating input 452 to color data production logic 490. The interpolated third color image data 473 is provided at a negating input 453 to the color data production logic 490. The color data production logic 490 also receives the first color data 408 at an input 454. The color data production logic 490 may include fourth color data production logic 474 that is configured to subtract the interpolated second color image data 472 from the first color data 408 to generate fourth color image data 476. The color data production logic 490 may also include fifth color data production logic 475 that is configured to subtract the interpolated third color image data 473 from the first color data 408 to generate fifth color image data 477.

The fourth color image data 476 and the fifth color image data 477 are provided to adaptive bi-cubic spline interpolation logic, such as an adaptive bi-cubic spline interpolation logic using rotated weighting grid 478, that is configured to receive the fourth color image data 476 and to generate interpolated fourth color image data 484, and that is also configured to receive the fifth color image data 477 and to generate interpolated fifth color image data 485.

In a particular embodiment, the interpolated fourth color image data 484 is provided to a first input 458 and the interpolated fifth color image data 485 is provided to a second input 459 of interpolated first color data production logic 486. The second color data 404 is provided to a third input 461 and the third color data 406 is provided to a fourth input 460 of the interpolated first color data production logic 486. The interpolated first color data production logic 486 is configured to add the second color data 404 to the interpolated fourth color image data 484 to produce interpolated first color data 420 at locations associated with the second color data 404. The interpolated first color data production logic 486 is also configured to add the third color data 406 to the interpolated fifth color data 485 to produce interpolated first color data 420 at locations associated with the third color data 406.

The feature extraction module 416 is configured to perform derivative operations associated with the input image data 401. For example, the feature extraction module 416 may be configured to receive the input image data 401 and to output feature data 417 associated with directional derivatives of the input image data. The feature data 417 may include a multidimensional feature vector comprising local directional derivatives. For example, in a particular embodiment, the feature data 417 includes three dimensional data 424 having values of three directional derivative operations. In another particular embodiment, the feature data 417 includes twenty-seven dimensional data 426 having values of twenty-seven directional derivative operations.

In a particular embodiment, the classifier module 418 may be configured to receive the feature data 417 and to generate the classifier output 412 associated with an orientation of an image feature associated with the input image data 401. The classifier module 418 may be configured to implement one or more classification algorithms, such as by using an Adaboost module 428 or a Gaussian mixture model module 430. For example, where the feature data 417 includes a multidimensional feature vector, the classifier module 418 may be adapted to use the multidimensional feature vector in a Gaussian mixture model type algorithm or an Adaboost type algorithm. As an illustrative, non-limited example, the classifier module 418 may be configured to selectively determine the classifier output 412 using a Gaussian mixture model type algorithm when the feature data 417 includes the three dimensional data 424 or using an Adaboost type algorithm when the feature data 417 includes the twenty-seven dimensional data 426.

In a particular embodiment, the adaptive bi-cubic spline interpolation logic 478 is configured to receive the classifier output 412 at an input 456. The adaptive bi-cubic spline interpolation logic 478 includes an initial value estimator module 480 that is configured to generate an initial value of the interpolated fourth color image data 484 and an initial value of the interpolated fifth color image data 485 using the classifier output 412. The initial value estimator module 480 may be configured to estimate an initial value at a particular location of the input image data by applying the classifier output 412 to values at locations neighboring the particular location. For example, where the classifier output 412 indicates the image has a vertical feature at a particular pixel, the image may be assumed to be slowly varying in the vertical direction but quickly varying in the horizontal direction at or near the particular pixel. Thus, the initial estimated value of that particular pixel may be more strongly based on values of one or more vertically neighboring pixels than values of horizontally neighboring pixels.

The adaptive bi-cubic spline interpolation logic 478 is configured to interpolate the fourth color image data 476 using the initial value of the interpolated fourth color data 484 and an adaptive weighting function module 482. The adaptive bi-cubic spline interpolation logic 478 is also configured to interpolate the fifth color image data 477 using the initial value of the interpolated fifth color image data 485 and the adaptive weighting function module 482. The adaptive weighting function module 482 may be adapted to generate an interpolated value at a particular location using a discounted value of a nearby location by applying a weighting function to a difference between the value of the nearby location and the initial value, as discussed with respect to FIG. 3. In a particular embodiment, the weighting function includes an exponentiation to a power of four of the difference between the value of the nearby location and the initial value, as discussed with respect to FIG. 3.

In a particular embodiment, the interpolated first color data 420 is generated using the second color data 404 to interpolate pixel values at columns of the mosaic image data 402 having alternating first and second color pixels, and using the third color data 406 to interpolate pixel values at columns of the mosaic input data 402 having alternating first and third color pixels. Thus, interpolated first color data 420 may be generally more accurate than the interpolated first color data 320 depicted in FIG. 3. The system 400 can operate on any mosaic image data: for example, the mosaic image data 402 may correspond to a Bayer mosaic pattern where the first color is green, the second color is red, the third color is blue, the fourth color is yellow, and the fifth color is cyan. As another example the mosaic image data 402 may correspond to a Bayer mosaic pattern where the first color is green, the second color is blue, the third color is red, the fourth color is cyan, and the fifth color is magenta. As another example, the mosaic image data 402 may correspond to a cyan-magenta-yellow (CMY) mosaic pattern where the first color is yellow, the second color is magenta, and third color is cyan, the fourth color is red, and the fifth color is blue. As yet another example, the mosaic image data 402 may correspond to a cyan-magenta-yellow (CMY) mosaic pattern where the first color is yellow, the second color is cyan, the third color is magenta, the fourth color is blue, and the fifth color is red. Although described for illustrative purposes using three colors, in other embodiments the system 400 may perform demosaicing on image data that includes any number of colors or non-color components. Examples of four-component mosaic image data that may be demosaiced using the system 400 include red-green-blue-emerald (RGBE), cyan-yellow-green-magenta (CYGM), and red-green-blue-white (or luminance or panchromatic) (RGBW), as illustrative, non-limiting examples.

Figure 5:
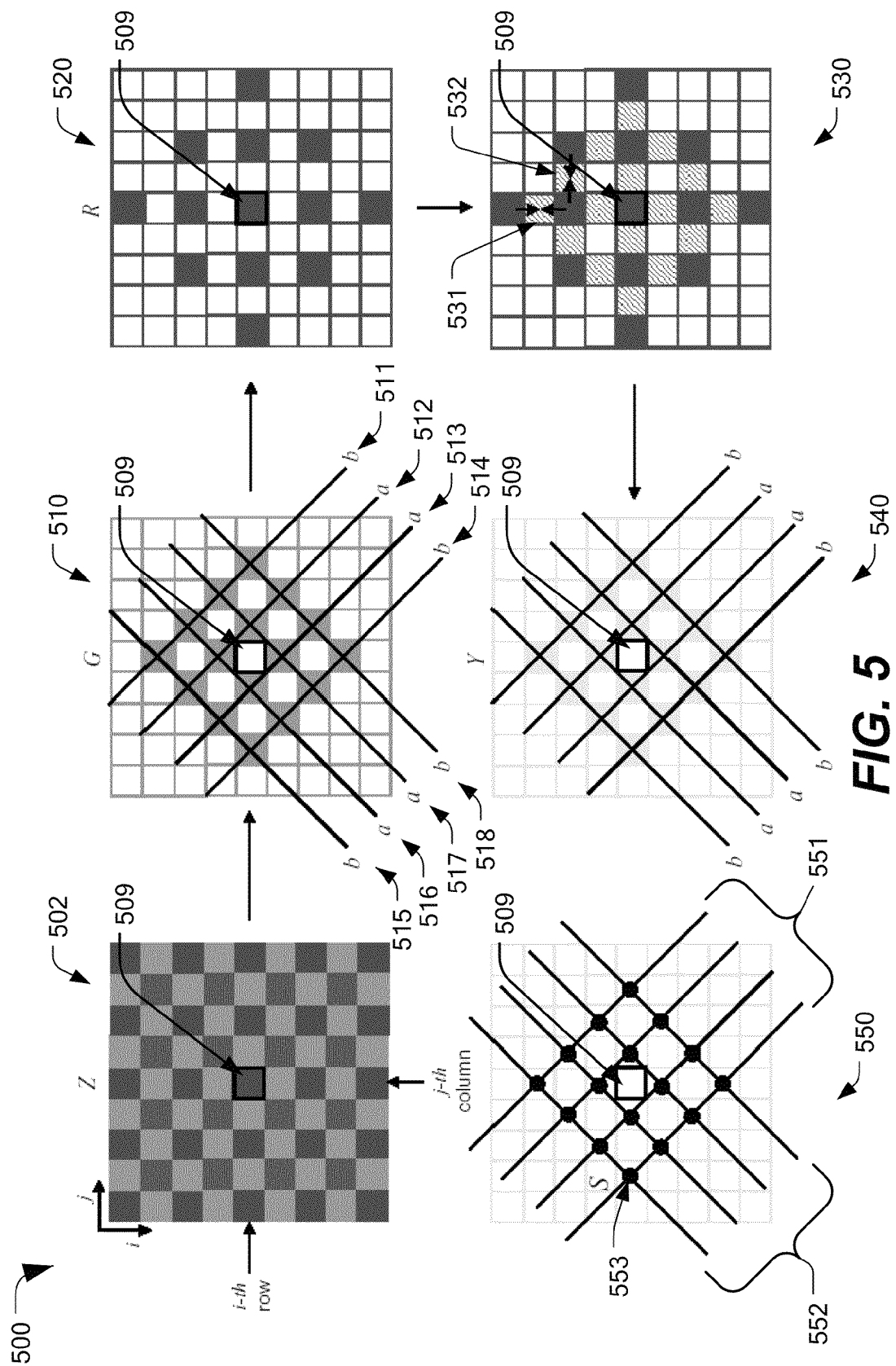
FIG. 5 is a general diagram illustrating an interpolation of Bayer mosaic image data in accordance with a particular embodiment.

Referring to FIG. 5, a general diagram illustrating an interpolation of Bayer mosaic image data in accordance with a particular embodiment is depicted and generally designated 500. In a particular embodiment, the interpolation 500 may be performed at the demosaicing module with adaptive bi-cubic spline 110 of FIG. 1, at the interpolation module 205 of FIG. 2, at the interpolation filter 314 of FIG. 3, at the interpolation filter 414 of FIG. 4, or any combination thereof.

At 502, a Bayer mosaic image data is depicted as a rectangular grid with odd columns, including the (j−4)-th, (j−2)-th, j-th, (j+2)-th, and (j+4)-th columns, having alternating red and green pixels, and with even columns, including the (j−3)-th, (j−1)-th, (j+1)-th, and (j+3)-th columns, having alternating blue and green pixels. A particular pixel 509 is highlighted at the intersection of the i-th row and the j-th column. A red pixel is located at the highlighted pixel 509.

Sixteen nearest neighbors to the pixel 509 and a rotated weighting grid are illustrated at 510. Each of the sixteen nearest neighbors to the pixel 509 is a green pixel. The rotated weighting grid includes eight weighting lines 511-518 that are aligned at approximately a forty-five degree angle to the rows and columns of the image data to form a grid similarly rotated at a forty-five degree angle to the image data. Each weighting line 511-518 is associated with a first weight "a" or a second weight "b." The sixteen nearest neighbors coincide with intersections of a first set of the weighting lines 511-514 with a second set of the weighting lines 515-518.

Each of the sixteen nearest neighbors is assigned a weight equal to a product of the weights of the weighting lines 511-518 that intersect at that pixel location. For example, the pixel located at the intersection of the weighting line 511 (having the weight "b") with the weighting line 515 (having the weight "b") is assigned a weight corresponding to b*b (where "*" indicates a multiplication operation) or "$b^2$" (where the superscript "2" indicates exponentiation to the second power). As another example, the pixel located at the intersection of the weighting line 511 (having the weight "b") with the weighting line 516 (having the weight "a") is assigned a weight corresponding to a*b or "ab". As another example, the pixel located at the intersection of the weighting line 512 (having the weight "a") with the weighting line 517 (having the weight "a") is assigned a weight corresponding to a*a or "$a^2$" (where the superscript "2" indicates exponentiation to the second power).

Each of the sixteen nearest neighbor green pixels is adjacent to and located between a respective pair of red pixels, as depicted at 520. A red value corresponding to each of the sixteen nearest neighbor green pixels may be interpolated as the average (arithmetic mean) of the red values of each respective pair of red pixels. For example, an interpolated red value at a pixel location 531 may be the average of the red values of the adjacent pixels above and below the pixel location 531. As another example, an interpolated red value at a pixel location 532 may be the average of the red values of the adjacent pixels to the left and to the right of the pixel location 532.

The interpolated red value (shown at 530) may be subtracted from the green value (shown at 510) for each of the sixteen nearest neighbors to the pixel 509 to generate a difference value corresponding to a fourth color, depicted at 540.

An interpolated value of the fourth color at the pixel 509 may be calculated using the fourth color values at the sixteen nearest neighbor pixels (designated as a set "S" of pixel locations), adjusted by the weights assigned in accordance with the intersections (e.g., the intersection 553) of the first set of weighting lines 551 with the second set of weighting lines 552, as depicted at 550.

Thus, an interpolated value at a particular location using weighted values of sixteen nearby locations by applying the rotated weighting grid to values at the sixteen nearby locations, the rotated weighting grid indicating one of a square of a first weighting factor, a square of a second weighting factor, and a product of the first weighting factor and the second weighting factor.

Using the system 300 of FIG. 3 as an illustrative example, the second color interpolator 370 may perform the interpolation shown at 530 to generate the interpolated second color image data 372, which in the present example includes the interpolated red values at the pixel locations 531 and 532. The fourth color data production logic 374 may generate the fourth color image data 376, including the difference data illustrated at 540. The adaptive bi-cubic spline interpolation logic 378 may estimate an initial value of the fourth color at the pixel 509. (Although the system 300 of FIG. 3 estimates the initial value of the fourth color using the classifier output 312, in other embodiments the initial value may instead be determined using other methods or techniques.) The adaptive bi-cubic spline interpolation logic 378 may use the rotated weighting grid formed by the weighting lines 551 and 552 in conjunction with a pixel similarity weighting function to interpolate a value of the fourth color at the pixel 509.

Figure 6:
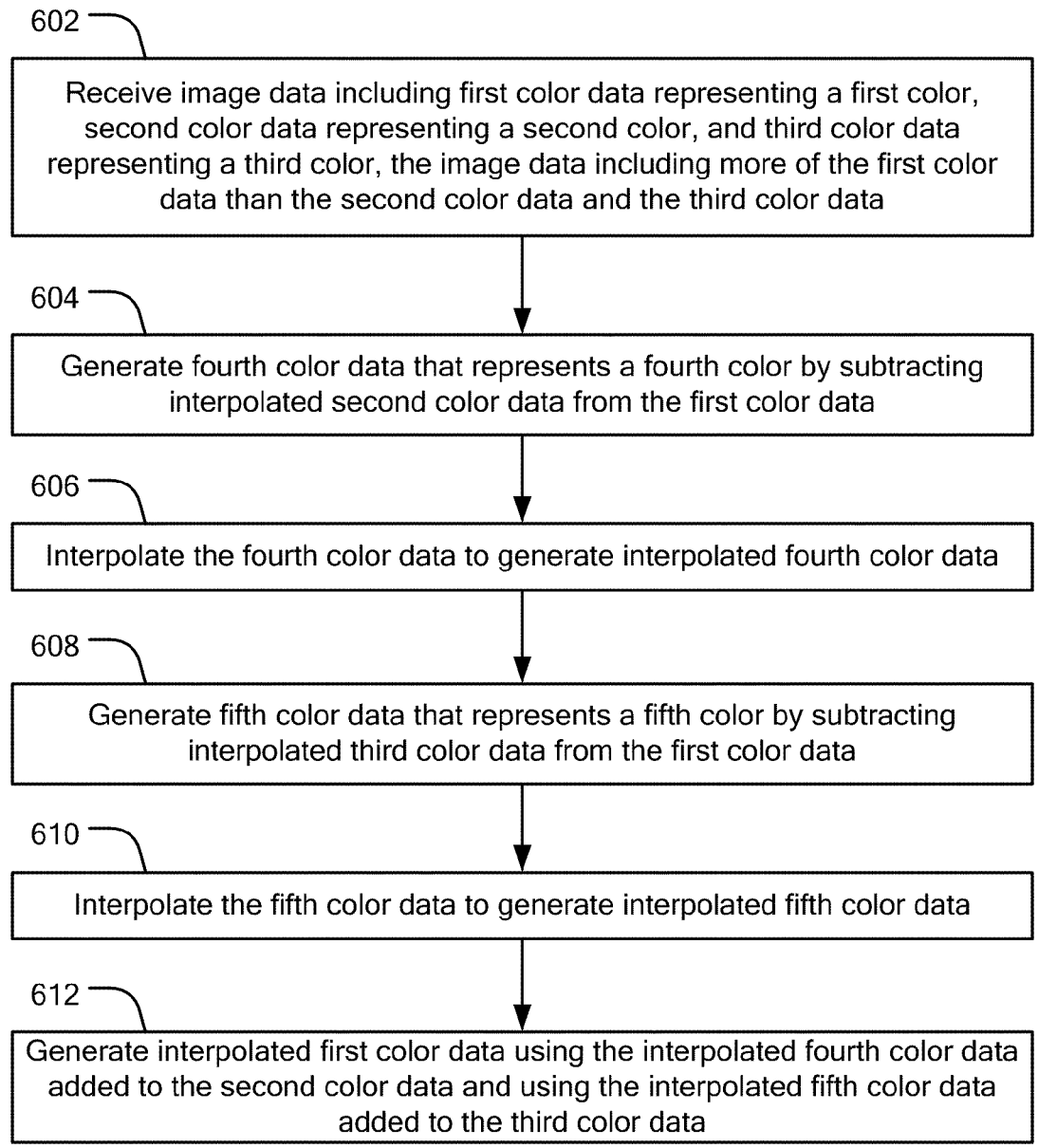
FIG. 6 is a flow chart of a first particular illustrative embodiment of an interpolation method.

Referring to FIG. 6, a flow chart of a first particular illustrative embodiment of an interpolation method is depicted. Generally, the interpolation method may be performed by one or more of the systems depicted in FIGS. 1, 2, and 4; portions of the interpolation method may be performed by the system depicted in FIG. 3; the interpolation method may be performed at other image processing systems or devices; or any combination thereof.

At 602, image data is received including first color data representing a first color, second color data representing a second color, and third color data representing a third color, the image data including more of the first color data than the second color data and the third color data. Advancing to 604, fourth color data that represents a fourth color is generated by subtracting interpolated second color data from the first color data.

Continuing to 606, the fourth color data is interpolated to generate interpolated fourth color data. In a particular embodiment, interpolating the fourth color data may include performing an adaptive bi-cubic spline interpolation operation using sixteen nearest neighbors. The adaptive bi-cubic spline interpolation operation may adjust an interpolation value based on an exponentiation to a power of four of a difference of an initial value and a nearby value.

Proceeding to 608, in a particular embodiment, fifth color data that represents a fifth color is generated by subtracting interpolated fifth color data from the first color data. Moving to 610, in a particular embodiment, the fifth color data is interpolated to generate interpolated fifth color data. In a particular embodiment, interpolating the fifth color data may include performing an adaptive bi-cubic spline interpolation operation using sixteen nearest neighbors.

Advancing to 612, interpolated first color data is generated using the interpolated fourth color data added to the second color data and using the interpolated fifth color data added to the third color data.

Figure 7:
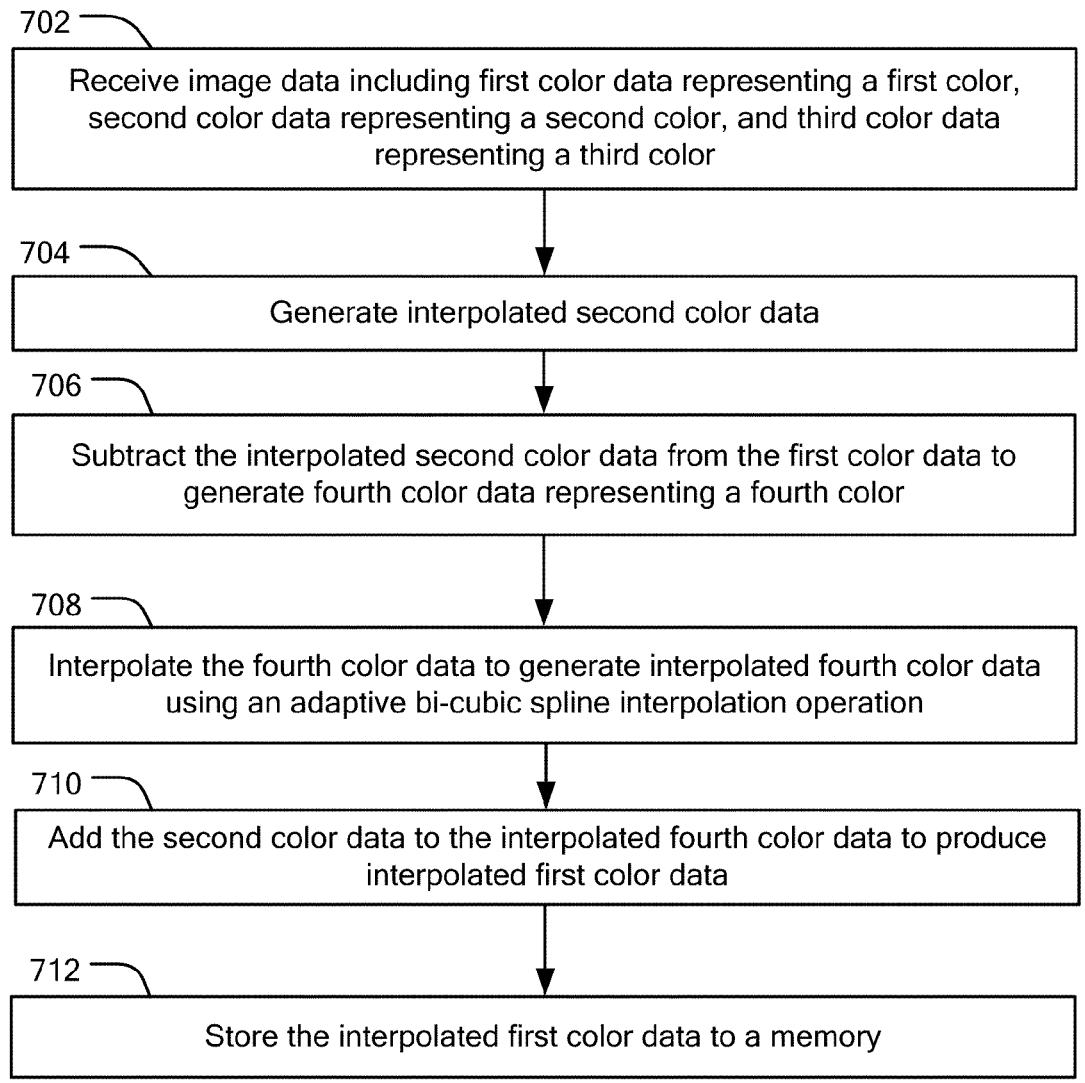
FIG. 7 is a flow chart of a second particular illustrative embodiment of an interpolation method.

Referring to FIG. 7, a flow chart of a second particular illustrative embodiment of an interpolation method is depicted. Generally, the interpolation method may be performed by one or more of the systems depicted in FIGS. 1-4, other image processing systems or devices, or any combination thereof. For example, a portable electronic device having a camera may include a processor readable medium, such as a memory, that stores instructions that are executable by a processor of the portable electronic device to perform the interpolation method to demosaic image data that is generated by the camera.

At 702, image data is received including first color data representing a first color, second color data representing a second color, and third color data representing a third color. For example, the first color may be green, the second color may be red, and the third color may be blue. Continuing to 704, interpolated second color data is generated, such as by duplicating or averaging values of nearby pixels. Proceeding to 706, the interpolated second color data is subtracted from the first color data to generate fourth color data representing a fourth color. For example, the fourth color may correspond to yellow.

Advancing to 708, the fourth color data is interpolated to generate interpolated fourth color data using an adaptive bi-cubic spline interpolation operation. In a particular embodiment, interpolating the fourth color data is performed using a rotated weighting grid. For example, the adaptive bi-cubic spline interpolation operation may apply a rotated weighting grid to adjust values of the fourth color data at predetermined positions relative to a particular location. To illustrate, the predetermined positions may correspond to the set S of sixteen nearest neighbors, and the rotated weighting grid may correspond to the rotated weighting grid formed by the weighting lines 511-518, depicted in FIG. 5.

In a particular embodiment, the adaptive bi-cubic spline interpolation operation divides each value of the fourth color at the predetermined positions by a difference between an initial value of the particular location and the value of the fourth color at the predetermined position, the difference raised to the fourth power.

Moving to 710, the second color data is added to the interpolated fourth color data to produce interpolated first color data. The interpolated first color data is saved to a memory, at 712.

Figure 8:
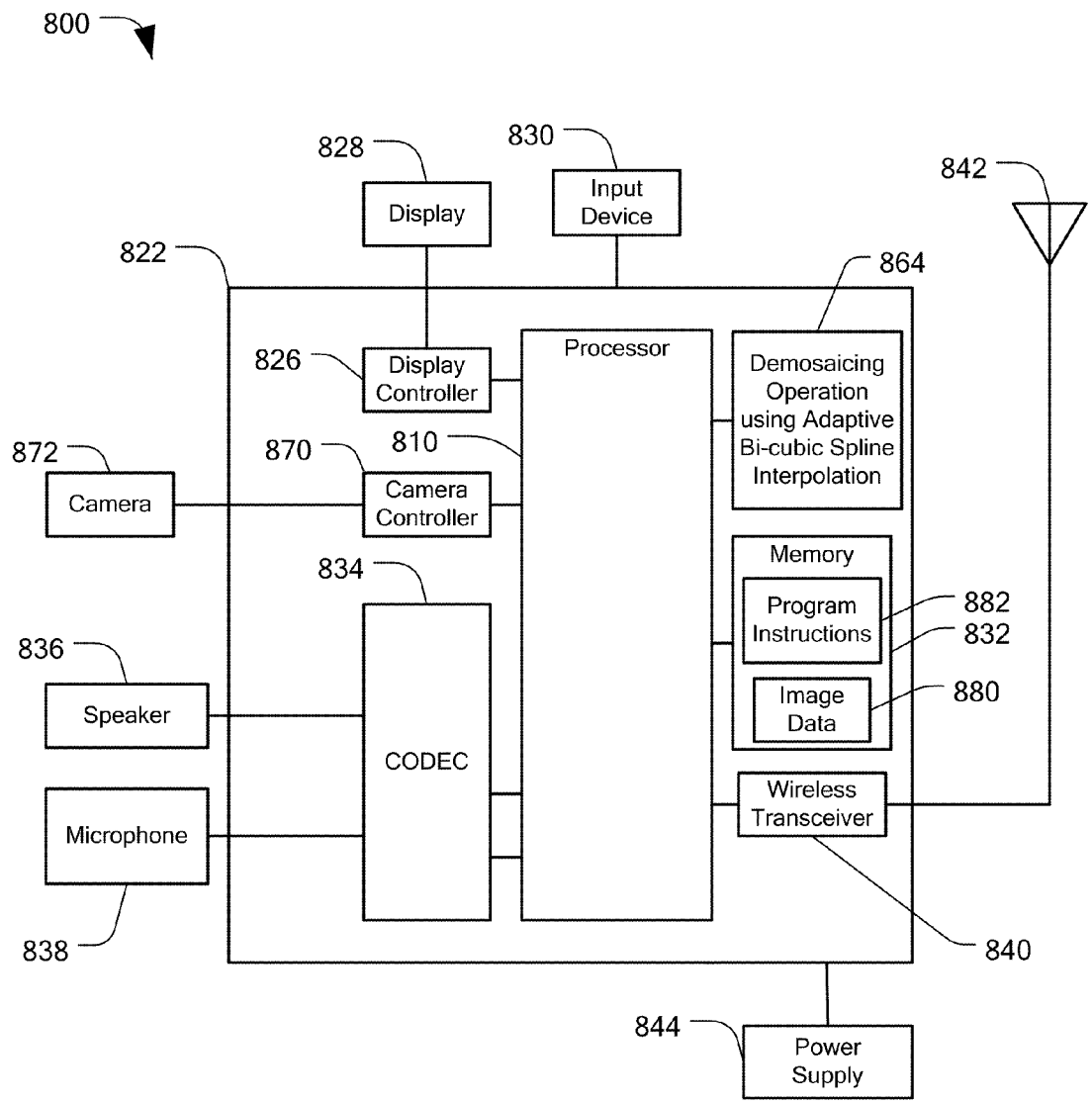
FIG. 8 is a block diagram of a portable device including a demosaicing operation using adaptive bi-cubic spline interpolation.

Referring to FIG. 8, a particular illustrative embodiment of a portable device including a demosaicing operation using adaptive bi-cubic spline interpolation is depicted and generally designated 800. The device 800 includes a processor 810, such as a general processor, a digital signal processor (DSP), or an image processor, coupled to a memory 832 and also coupled to a demosaicing operation using adaptive bi-cubic spline interpolation module 864. In an illustrative example, the demosaicing operation using adaptive bi-cubic spline interpolation module 864 may be executable using program instructions 882 that stored in the memory 832 and that are executable by the processor 810. In other embodiments, the demosaicing operation using adaptive bi-cubic spline interpolation module 864 may be implemented in hardware, firmware, or any combination thereof, and may include one or more systems depicted in FIGS. 1-4 or may operate in accordance with one or more of the methods depicted in FIG. 6 and FIG. 7.

A camera 872 is coupled to the processor 810 via a camera controller 870. The camera 872 may include a still camera, a video camera, or any combination thereof. The camera controller 870 is adapted to control an operation of the camera 870, including storing captured image data 880 at the memory 832.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834.

FIG. 8 also indicates that a wireless transceiver 840 can be coupled to the processor 810 and to a wireless antenna 842. In a particular embodiment, the processor 810, the display controller 826, the memory 832, the CODEC 834, the wireless transceiver 840, the camera controller 870, and the demosaicing operation using adaptive bi-cubic spline interpolation module 864 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 842, the camera 872, and the power supply 844 are external to the system-on-chip device 822. However, each of the display 828, the input device 830, the speaker 836, the microphone 838, the wireless antenna 842, the camera 872, and the power supply 844 can be coupled to a component of the system-on-chip device 822, such as an interface or a controller.

Figure 9:
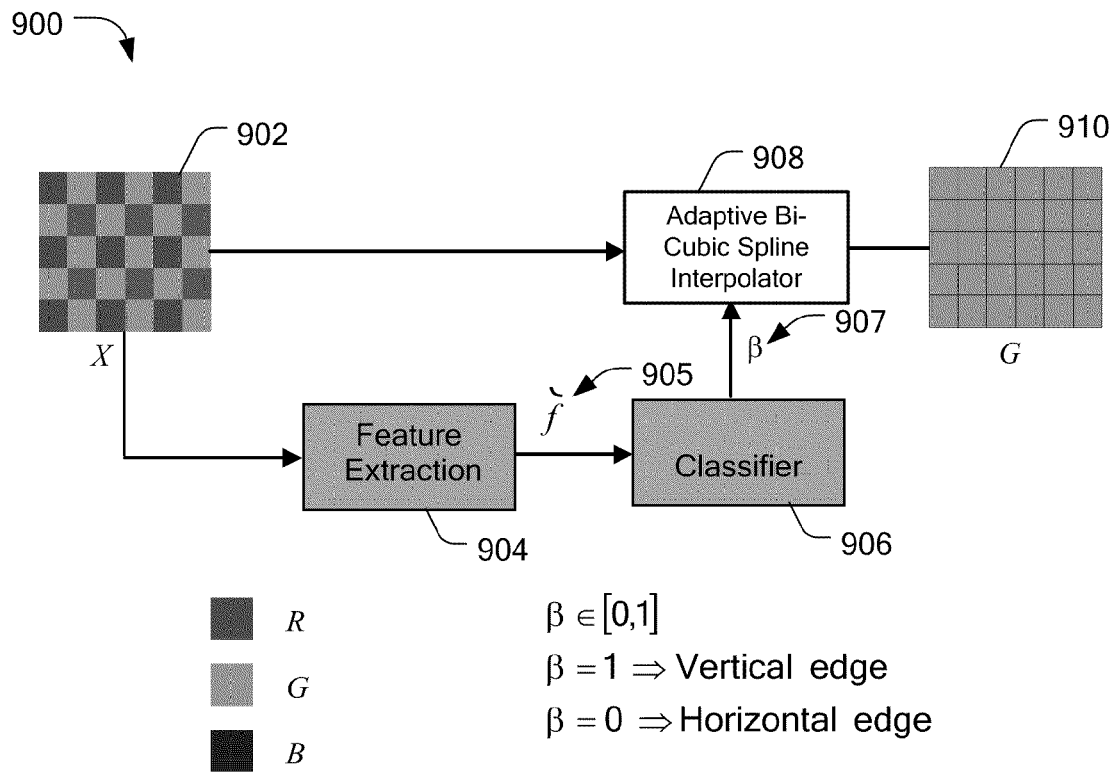
FIG. 9 is a block diagram of a particular illustrative embodiment of a demosaicing system.

Referring to FIG. 9, a particular illustrative embodiment of a demosaicing system is depicted and generally designated 900. A digital color image may include three color samples, namely red (R), green (G), and blue (B), at each pixel location. However, using three separate color sensors for measuring the three R, G, and B color values at each pixel location in a digital camera may be very expensive. Thus, a digital camera may employ a single-chip image sensor, where each pixel in the image sensor is covered with an R, G, or B color filter for capturing the color information. The mosaic of tiny color filters covering the pixels in a single-chip image sensor is referred to as the color filter array (CFA). The most commonly used CFA is the Bayer mosaic 902 formed by the replication of two-by-two sub-mosaics, with each sub-mosaic containing two green, one blue, and one red filter. The process of reconstructing a complete RGB color image from the CFA samples captured by a digital camera is often referred to as demosaicing.

One observation that can be exploited in demosaicing is that, compared to the observed R, G, or B color values, the color differences (R−G or B−G) or color ratios (R/G or B/G) remain relatively constant within an object in an image. The high frequency components in a color difference (chrominance) or a color ratio (hue) channel are thus significantly reduced, making the interpolation of such a channel considerably less challenging.

Demosaicing based on a constant-chrominance or constant-hue assumption can begin with interpolation of the missing G pixels. A non-linear interpolation technique based on an edge-sensing or other framework may be used for interpolating the G channel. After the G channel has been interpolated, sparse difference (R−G and B−G) or ratio (R/G and B/G) channels are formed, which may then interpolated using a relatively simpler interpolation technique, such as bilinear or bi-cubic interpolation. Finally, the missing R and B pixel values may be determined by adding (or multiplying) the G pixel values to the pixels in the interpolated difference (or ratio) channels. The system 200 of FIG. 2 may implement an algorithm based on such a constant-chrominance assumption.

In a particular embodiment, a demosaic algorithm may exploit correlation among the R, G, and B color planes by using the luminance/chrominance decomposition framework shown in FIG. 2, including the interpolation module 205 to interpolate the G color plane and the first and second difference channels 240 and 260 to interpolate the R and B channels, respectively. For interpolating the G channel, a spatially-adaptive non-linear filter, referred to hereinafter as a adaptive bi-cubic spline interpolator, may be used. The spatially adaptive coefficients of the interpolation kernel are selected by making use of a monotonically decreasing pixel-similarity measure function. The role of the pixel-similarity measure in determining the filter weights includes reducing contribution from neighboring pixels whose intensity values are expected to be far from the value of the unknown pixel being interpolated. A first order estimate of the unknown pixel, determined by a fast interpolation algorithm, is used to quantify which pixels in the local neighborhood should be considered outliers in determining the interpolation of the current missing pixel. Once the G-channel has been completely estimated, the difference channels R-G and B-G are interpolated using bilinear interpolation, based on which the missing R and B pixel values are estimated.

Demosaic Algorithm

Let $R_s$, $G_s$, and $B_s$ respectively denote the values of the red, green, and blue pixels located at position $s=(s_1,s_2)$ on a 2-D rectangular sampling grid. In a Bayer CFA image, only one of the three $R_s$, $G_s$, or $B_s$ color values is known at the pixel locations s; the remaining two color values must be estimated. Let $I_s^C$ denote the indicator function that equals one when the observed color at pixel location s in a Bayer CFA image is C, and equals zero otherwise. The Bayer mosaic $X_s$ can then be expressed as $X_s=R_s I_s^R + G_s I_s^G + B_s I_s^B$. One goal of the demosaic algorithm is to estimate the unknown color values $R_s$, $G_s$, or $B_s$ at each pixel position given the Bayer mosaic data.

Interpolation of Green Channel

In a particular embodiment, the demosaic algorithm works by first interpolating the G channel which, on a Bayer mosaic, is sampled twice as densely as either the R or the B channel and is thus easier to interpolate. The block diagram of a G channel interpolator system based on the algorithm used for interpolation of the G channel is shown in FIG. 9. First, a spatial feature vector $\vec{f}$ 905 is extracted at a feature extraction module 904 using local pixels in the Bayer CFA image X 902. A spatial feature vector classifier 906 is then used to estimate a parameter β907 that characterizes a strength and orientation of an edge in the local window. Finally, a spatially adaptive non-linear filter 908 is used to estimate the missing green pixel value; the general rule followed by the interpolating kernel is to weight the pixels more heavily along the edge and less heavily across the edge for estimating the missing green pixel value.

The framework of the G channel interpolator, shown in FIG. 9, may be similar to an edge-directed demosaic algorithm. For specific choices of the feature vector and classifier decision rule, the framework also encompasses a homogeneity-directed interpolation algorithm. A demosaic performance improvement in accordance with a particular embodiment is due primarily to the non-linear filtering procedure labeled as adaptive bi-cubic spline interpolator 908 in FIG. 9.

Feature Vector

The feature vector 905 is 2-dimensional, where an individual component of the feature vector 905 is determined as the absolute sum of the first-order and second-order spatial derivatives computed in the horizontal or the vertical direction. This feature vector 905 may be appropriate for edge-directed interpolation. Assuming that the first- and second-order directional derivatives of X 902 in a particular direction (say the x-direction) are denoted by $\nabla_x X$ and $\nabla_{xx} X$, respectively, the feature vector $\vec{f}$ 905 can be expressed as $$\vec{f}=(f_1,f_2)=(|\nabla_x X|+|\nabla_{xx} X|,|\nabla_y X|+|\nabla_{yy} X|). \quad (1)$$

Defining $h=(-1,0,1)^T$ and $g=(-1,0,2,0,-1)^T$ as, respectively, the first- and second-order derivative estimation kernels, the four horizontal and vertical directional derivatives at the current pixel location s are computed using the following set of equations:

$$(\nabla_x X)_s=(h^T * X)_s,$$

$$(\nabla_{xx} X)_s=(g^T * X)_s,$$

$$(\nabla_y X)_s=(h * X)_s, \text{ and}$$

$$(\nabla_{yy} X)_s=(g * X)_s,$$

where * denotes the 1-D convolution operation and $h^T$ denotes the transpose of h.

Classifier Decision Rule

Once the feature vector $\vec{f}$ 905 has been computed, the classifier decision rule β907 for determining the interpolation direction is computed as a linear combination of the individual components of the feature vector and is range limited to 0-1. Specifically, the classifier decision rule β907 is given by $$\beta = \frac{1}{256}\max(\min((f_1 - f_2 + 128), 256)), \quad (2)$$

where β=1 signifies the presence of a vertical edge while β=0 signifies the presence of a horizontal edge. The classifier decision rule is used to derive the weights of the non-linear spatially adaptive interpolation kernel as discussed in the following sub-section. Compared to other possible decision rules, such as β=0 when $f_1<f_2$ and β=1 otherwise, the decision rule in (2) spans the range from 0 to 1 smoothly, which helps make misclassification artifacts less objectionable.

Adaptive Bi-Cubic Spline Interpolator

The low-frequency components in the R, G, and B color channels of an image may be very dissimilar, but the high frequency components in the three color channels may be highly correlated. Thus, while interpolating one the three channels, high frequency information may be extracted from the remaining two channels, and the high-pass information may be used to improve the estimation of the channel being interpolated. This approach may be particularly effective in the suppression of aliasing artifacts during interpolation.

On a Bayer CFA sampling grid, the unknown G pixels are at locations where either the R or the B pixel values are known. If the missing G pixel is being estimated at a location where the R sample is known, the interpolation may be performed by extracting high-pass frequency components from the local R pixels, and adding the high-pass filtered R value to the low-pass frequency components acquired from the neighboring G pixels. On the other hand, while interpolating the missing G pixel value at a known B pixel location, the high-pass frequency components may be acquired from the neighboring B pixels instead of the neighboring R pixels.

The G-channel interpolator of FIG. 9 is non-linear, spatially adaptive and, works in a manner similar to that discussed in the previous paragraph. Specifically, assuming s denotes a location on the 2-D grid where the red pixel value $R_s$ is known, the value of $G_s$ is determined as $$\hat{G}_s = R_s + \sum_{r \in \eta_s^G} \alpha_{r,s}(G_r - R_r), \quad (3)$$

where $r \in \eta_s^G$ denote the pixel neighbors of s and $\alpha_{r,s}$ denote the coefficients of the low-pass adaptive bi-cubic spline interpolator. High-pass information is used only from the neighboring R-pixels in estimating the missing G-pixel value.

Figure 10:
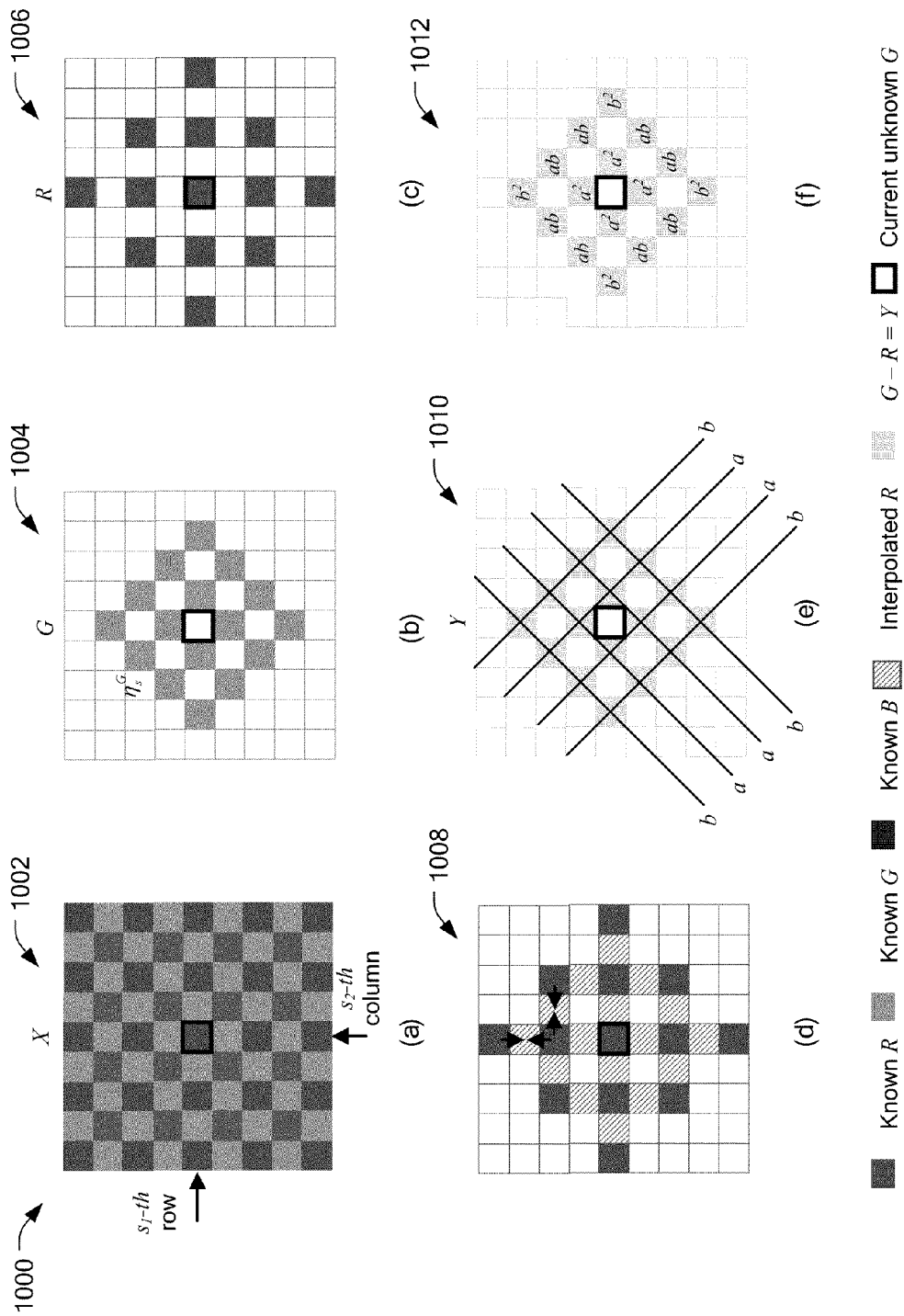
FIG. 10 is a general diagram illustrating a particular embodiment of a local pixel neighborhood to interpolate a missing green pixel using an adaptive bi-cubic spline interpolator.

For discussion in this and the following paragraphs, reference is made to FIG. 10, where a particular embodiment of a local pixel neighborhood to interpolate a missing green pixel using an adaptive bi-cubic spline interpolator is depicted and generally designated 1000. At (a) 1002, a missing green pixel is at position $s=(s_1,s_2)$ in the Bayer mosaic where the red pixel value, $R_s$, is known. At (b) 1004, the set of known neighboring green pixel locations $\eta_s^G$ on a 4×4, 45°-rotated grid used for estimating $G_s$ is depicted. At (c) 1006 the set of known red pixels in the neighborhood of pixel s are depicted. At (d) 1008 the red pixel values are estimated at pixel locations $r \in \eta_s^G$. At (e) 1010 the difference (chrominance) channel Y is formed by subtracting the interpolated red pixel values from the known green pixel values. At (f) 1012 the weights assigned by the spatial component of the adaptive bi-cubic spline interpolator to the neighboring Y pixels during estimation of $Y_s$ are depicted.

The local spatial neighborhood G over which the averaging operation in (3) is performed includes 16 pixels located on a 4×4, 45°-rotated rectangular grid centered at the current pixel s. The pixel locations, r, including the local spatial neighborhood $\eta_s^G$ are the locations where only the G pixel values are observed, i.e. $X_r = G_r$. Hence, while the values $G_r$ in (3) are known, the values $R_r$ are unknown and must be estimated. The value of $R_r$ may be computed as the mean of two known R pixel values, aligned either vertically or horizontally, that are spatially closest to the pixel location r.

Using a fourth color, yellow or Y, to represent the band limited difference channel (G−R), the estimation of $G_s$ in (3) can be written as $$\hat{G}_s = R_s + \sum_{r \in \eta_s^G} \alpha_{r,s} Y_r = R_s + \hat{Y}_s, \quad (4)$$

where $\hat{Y}_s$ denotes the estimated value of the yellow pixel at s as computed by the adaptive bi-cubic spline interpolator filter coefficients $\alpha_{r,s}$. The filter coefficients $\alpha_{r,s}$ may be computed as $$\alpha_{r,s} = \frac{h_{r,s}g(|Y_r - \hat{Y}_s^i|)}{\sum_{r \in \eta_s^G} h_{r,s}g(|Y_r - \hat{Y}_s^i|)}, \quad (5)$$

and thus $\hat{Y}_s$ can be written as $$\hat{Y}_s = \frac{\sum_{r \in \eta_s^G} h_{r,s}g(|Y_r - \hat{Y}_s^i|)Y_r}{\sum_{r \in \eta_s^G} h_{r,s}g(|Y_r - \hat{Y}_s^i|)}. \quad (6)$$

In (5) and (6), $h_{r,s}$ represents the spatial component of the adaptive bi-cubic spline interpolator, g(x) is a monotonically decreasing of x, while $\hat{Y}_s^i$ is an initial estimate of $\hat{Y}_s$. The coefficients $h_{r,s}$ are spatially invariant and symmetric, and therefore can be written as $h_{r,s}=h_{r-s}=h_{s-r}$. The coefficients $h_{s-r}$ decrease with the increase in the spatial distance, |s−r|, between the neighboring and center pixels. The function g(x) is used to compute a measure of the similarity between neighboring and center pixel grayscale values, and to lower the contribution from those pixel neighbors, r, whose grayscale values, $Y_r$, differ significantly from the pre-estimated value of the center pixel s, $\hat{Y}_s^i$.

From (5) and (6), it may be observed that the adaptive bi-cubic spline interpolator may be similar to a bilateral filter, but is adapted for image interpolation rather than image denoising.

As illustrated at (e) 1010 and (f) 1012 of FIG. 10, the spatial component of the adaptive bi-cubic spline interpolator assumes only one of three unique values, i.e. $h_{r-s} \in \{a^2, ab, b^2\}$, determined by the spatial distance |s−r| between the neighboring and center pixels. In a particular embodiment, the value of a is empirically selected as 0.4 while the value of b is selected as 0.1.

In a particular embodiment, the pixel similarity measure function g(x) is also selected empirically based on the observed subjective and objective demosaic performance. The functional form of g(x) is given by $$g(x) = \frac{1}{1+\left(\frac{x}{16}\right)^4}. \quad (7)$$

Figure 11:
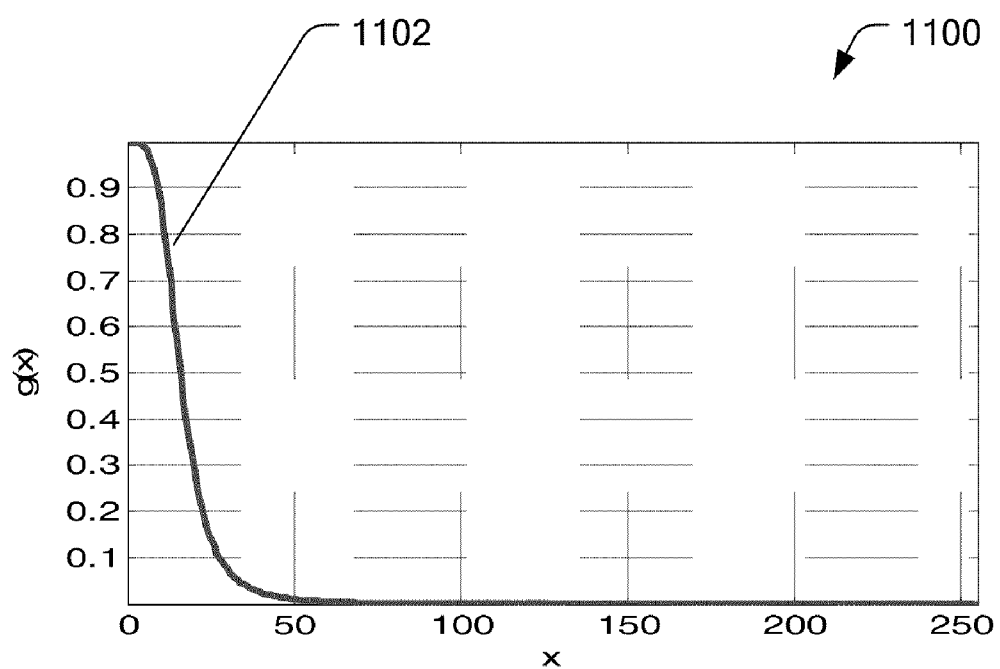
FIG. 11 is a diagram illustrating a particular embodiment of a pixel similarity function that may be used in an adaptive bi-cubic spline interpolator.

The plot of g(x) is shown as a curve 1102 in a particular illustrative embodiment 1100 of a pixel similarity measure function depicted in FIG. 11.

The initial value of $Y_s$ may be estimated using a convex average of pixels oriented along the vertical and horizontal directions. Specifically, $$\hat{Y}_s^i = \beta\left(\frac{Y_{s_1-1,s_2} + Y_{s_1+1,s_2}}{2}\right) + (1-\beta)\left(\frac{Y_{s_1,s_2-1} + Y_{s_1,s_2+1}}{2}\right), \quad (8)$$

where $\beta$ denotes the classifier decision rule discussed in the previous subsection.

Finally, the method discussed so far describes estimation of only those missing G-pixels that are at locations where the R pixel values are known. The estimates of the remaining half of the missing G-pixels, which are at the locations where the B-pixel values are known, can be computed by replacing the R-pixel values in (3) with the B-pixel values, and modifying the subsequent discussion accordingly.

Interpolation of Red and Blue Pixels

In a particular embodiment, once the G channel has been interpolated, the sub-sampled difference channels (R−G) and (B−G) are formed, where the pixel differences may be computed only at locations where the R or B pixel values are known. The sub-sampled difference channels may then be interpolated by a factor of 2 in each direction (vertical and horizontal) using a bilinear interpolation algorithm. Adding the G-pixel values back to the interpolated (R−G) and (B−G) chrominance planes yields the interpolations of R and B channels.

Experimental Results

In a particular embodiment, a performance of the demosaic algorithm including the embodiments discussed with respect to FIGS. 9-11 ("the adaptive bi-cubic spline interpolator") is evaluated on a set of 24, 768×512 (or 512×768) Kodak color images. The color images are first used to simulate Bayer CFA mosaics, which are then processed with different demosaic algorithms to obtain estimates of the original three-channel color images.

Four different demosaic algorithms are used for performance comparison in this section: (1) Bilinear interpolation; (2) Edge-directed interpolation; (3) Homogeneity-directed interpolation; (4) the adaptive bi-cubic spline interpolator.

To avoid division operations and to reduce the number of multiplications required, the pixel similarity measure function g(x) in (7) is implemented using a look-up-table (LUT) with 64 10-bit sized integer values. The divisions associated with the normalization of adaptive bi-cubic spline interpolator coefficients are implemented using a LUT of 512 10-bit sized integer values.

Figure 12:
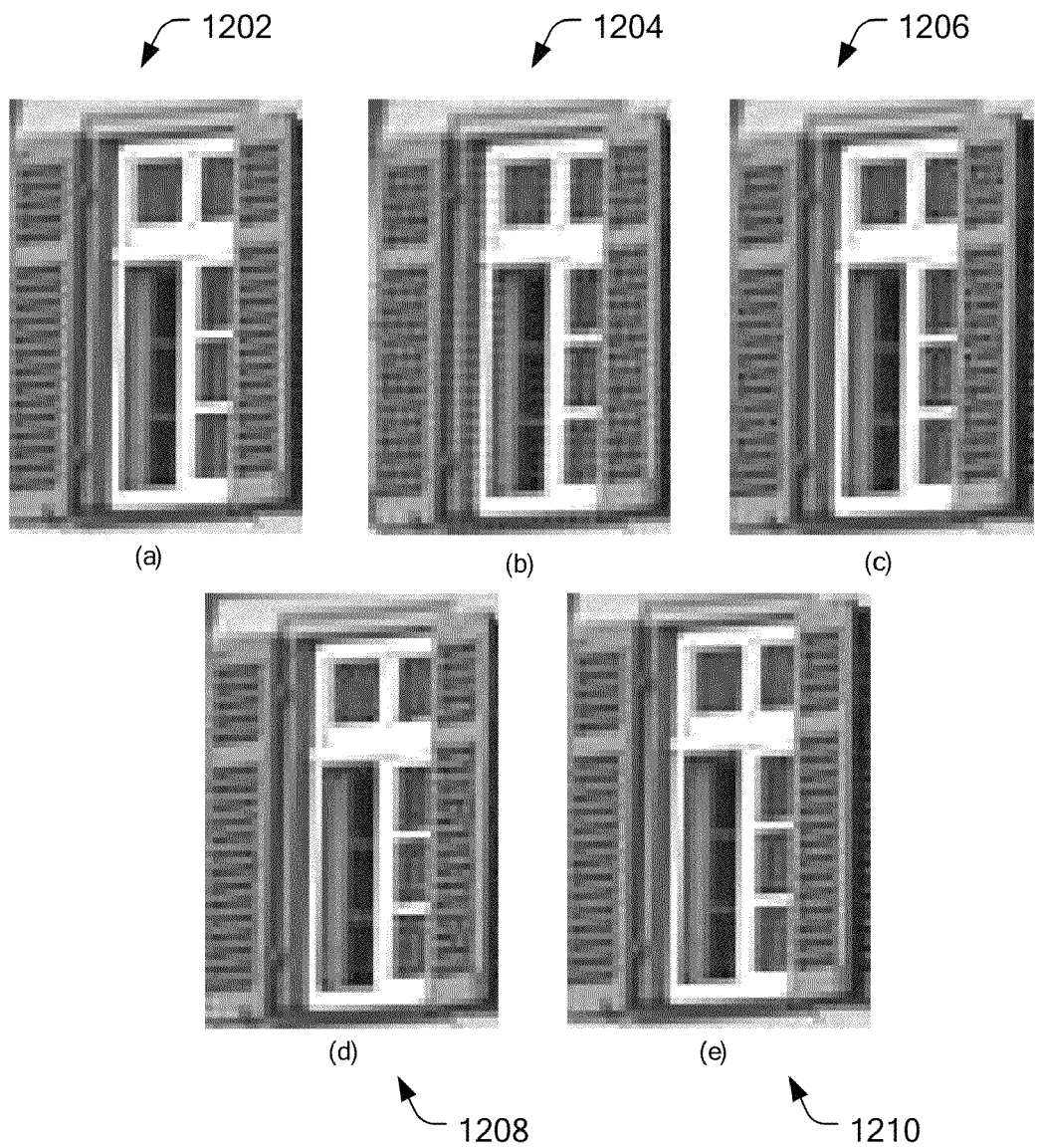
FIG. 12 is a diagram illustrating a first particular embodiment of demosaic results including results using an adaptive bi-cubic spline interpolator.
Figure 13:
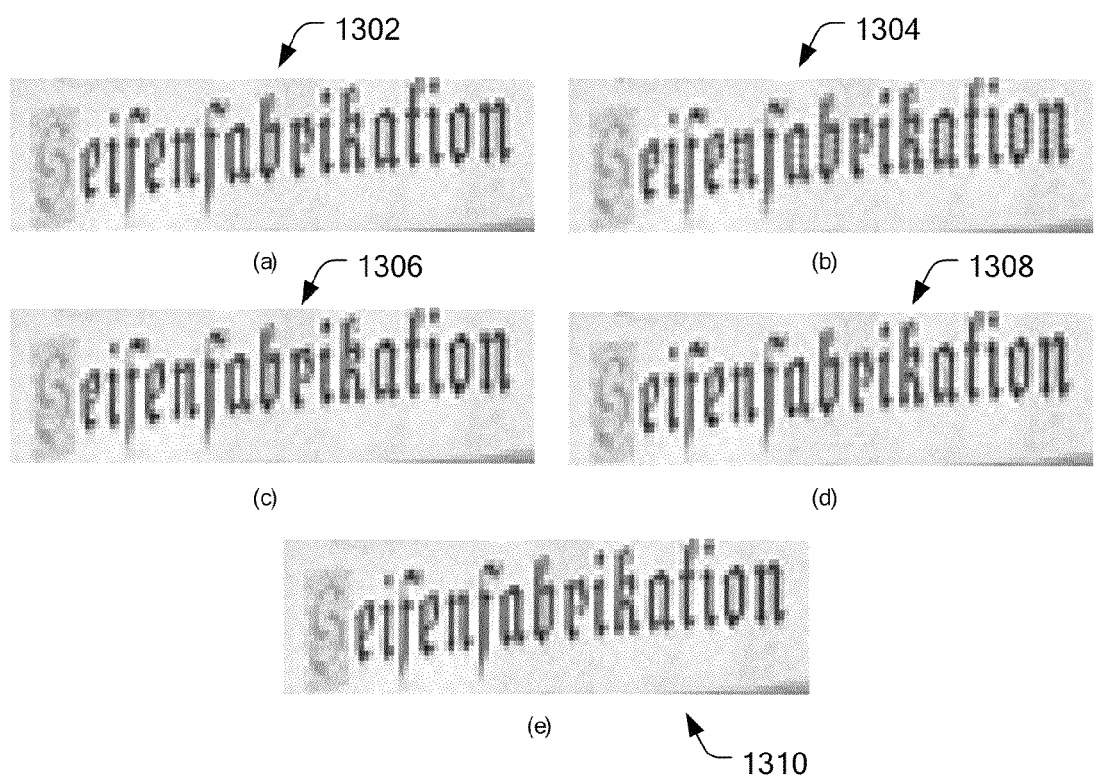
FIG. 13 is a diagram illustrating a second particular embodiment of demosaic results including results using an adaptive bi-cubic spline interpolator.

FIGS. 12 and 13 show particular demosaic results. FIG. 12 depicts a first particular embodiment of demosaic results including results using an embodiment of the adaptive bi-cubic spline interpolator. The results are depicted as images 1202, 1204, 1206, 1208, and 1210. FIG. 13 depicts a second particular embodiment of demosaic results including results using an embodiment of the adaptive bi-cubic spline interpolator. The results are depicted as images 1302, 1304, 1306, 1308, and 1310.

Images 1202 and 1302 show zoomed-in views of different portions of an original Kodak image. Images 1204 and 1304 are demosaiced images using bilinear interpolation. Images 1204 and 1304 demonstrate that bilinear interpolation, though efficient, may result in serious zipper and aliasing artifacts in the demosaiced images. The zipper artifacts are greatly reduced in the demosaiced images 1206 and 1306, as well as 1208 and 1308, which are, respectively, generated using edge-directed and homogeneity-directed interpolation algorithms. The demosaiced images generated using an embodiment of the adaptive bi-cubic spline interpolator are shown as images 1210 and 1310. Comparison of image 1210 to images 1204-1208 and image 1310 to 1304-1308 illustrates that the adaptive bi-cubic spline interpolator can provide substantial improvements in image quality over those of all of the other considered demosaicing solutions.

Table 1 depicts a particular illustrative embodiment of a comparison of a demosaicing algorithm including the adaptive bi-cubic spline interpolator.

TABLE 1

Average values of PSNR and YCxCx/Lab visually weighted image fidelity metric computed over a set 24 images using different demosaicing algorithms.

| | Bilinear | Edge-directed | Homogeneity-directed | Adaptive bi-cubic spline interpolator |
|---|---|---|---|---|
| PSNR (dB) | 37.25 | 37.79 | 37.81 | 39.76 |
| YCxCz/Lab ΔE | 2.05 | 1.72 | 1.72 | 1.62 |

In Table 1 the average performance of various demosaicing algorithms are compared over the test set of 24 Kodak images using two different objective measures of image quality: peak-signal-to-noise-ratio (PSNR) and YCxCz/Lab ΔE error. The YCxCz/Lab quality metric is based on the color difference in CIE-L*a*b*, but also accounts for the low-pass characteristic of the contrast sensitivity of the human visual system. The adaptive bi-cubic spline interpolator can provide a significant performance gain of approximately 2-dB over the homogeneity-directed interpolation algorithm, where the latter algorithm may perform better than other demosaic methods. The YCxCz/Lab ΔE error is also the lowest with the adaptive bi-cubic spline interpolator.

CONCLUSION

In a particular embodiment, an interpolation algorithm is disclosed for estimation of missing pixels in a color filter array data captured by a single-chip digital camera. Simulated Bayer color filter array mosaics illustrate that the interpolation algorithm may provide three-channel color reconstructions that are considerably superior to other demosaic solutions. Objective measures of image quality also suggest that the interpolation algorithm may outperform other demosaicing methods.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system comprising:
an input to receive image data;
an image processing system responsive to the image data and including a demosaicing module, the demosaicing module configured to receive input image data including first color data representing a first color, second color data representing a second color, and third color data representing a third color, and wherein the demosaicing module includes an interpolation filter configured to receive the input image data and to output filtered data including interpolated first color data, the interpolation filter including
logic to interpolate the second color data to generate interpolated second color data,
logic to subtract the interpolated second color data from the first color data to generate fourth color data,
adaptive bi-cubic spline interpolation logic configured to receive the fourth color data and to generate interpolated fourth color data, and
logic to add the second color data to the interpolated fourth color data to produce interpolated first color data at locations associated with the second color data;
an output responsive to the image processing system and adapted to provide output data.

2. The system of claim 1, wherein the first color is green, wherein the second color is red or blue, and wherein the fourth color is yellow or cyan.

3. The system of claim 1, wherein the first color is yellow, wherein the second color is magenta or cyan, and wherein the fourth color is red or blue.

4. The system of claim 1, wherein the feature extraction module is configured to perform derivative operations associated with the input image data, and wherein the feature data includes three dimensional data having values of three directional derivative operations or including twenty-seven dimensional data having values of twenty-seven directional derivative operations.

5. The system of claim 4, wherein the classifier module is configured to selectively determine the classifier output using a Gaussian mixture model type algorithm when the feature data includes the three dimensional data or using an Adaboost type algorithm when the feature data includes the twenty-seven dimensional data.

6. The system of claim 1, wherein the adaptive bi-cubic spline interpolation logic is configured to generate an initial value of the interpolated fourth color data using the classifier output and to interpolate the fourth color data using the initial value and an adaptive weighting function.

7. The system of claim 1 wherein the interpolation filter includes:
logic to interpolate the third color data to generate interpolated third color data;
logic to subtract the interpolated third color data from the first color data to generate fifth color data,
wherein the adaptive bi-cubic spline interpolation logic is further configured to receive the fifth color data and to generate interpolated fifth color data; and
logic to add the third color data to the interpolated fifth color data to produce interpolated first color data at locations associated with the third color data.

8. The system of claim 7, wherein the first color is green, wherein the second color is red, wherein the third color is blue, wherein the fourth color is yellow, and wherein the fifth color is cyan.

9. The system of claim 7, wherein the first color is yellow, wherein the second color is magenta, wherein the third color is cyan, wherein the fourth color is red, and wherein the fifth color is blue.

10. The system of claim 7, wherein the adaptive bi-cubic spline interpolation logic is configured to generate an initial value of the interpolated fourth color data using the classifier output and to interpolate the fourth color data using the initial value of the interpolated fourth color data and an adaptive weighting function, and wherein the adaptive bi-cubic spline interpolation logic is configured to generate an initial value of the interpolated fifth color data using the classifier output and to interpolate the fifth color data using the initial value of the interpolated fifth color data and the adaptive weighting function.

11. The system of claim 1, wherein the image processing system includes:
a gamma module to generate gamma corrected data from data received from the demosaicing module;
a color calibration module to perform a calibration on the gamma corrected data;
a color space conversion module coupled to convert an output of the color calibration module to a color space; and
a compress and store module to receive an output of the color space conversion module and to store compressed output data to the image storage device.

12. An interpolation system comprising:
a feature extraction module configured to receive input image data and to output feature data associated with directional derivatives of the input image data;
a classifier module configured to receive the feature data and to generate a classifier output associated with an orientation of an image feature associated with the input image data;
an interpolation filter configured to
receive first color data of the input image data, the input image data further including second color data representing a second color and third color data representing a third color, the first color appearing more frequently in the input image data than the second color and the third color, include adaptive bi-cubic spline interpolation logic configured to perform an interpolation operation, the bi-cubic spline interpolation logic including an initial value estimator module configured to estimate an initial value at a particular location of the input image data by applying the classifier output to values at locations neighboring the particular location, and an adaptive weighting function module to generate an interpolated value at the particular location using a discounted value of a nearby location by applying a weighting function to a difference between the value of the nearby location and the initial value, and generate interpolated first color data using the classifier output.

13. The interpolation system of claim 12, wherein the weighting function includes an exponentiation to a power of four of the difference between the value of the nearby location and the initial value.

14. The interpolation system of claim 12, wherein the adaptive bi-cubic spline interpolation logic is configured to generate an interpolated value at a particular location using weighted values of sixteen nearby locations by applying a rotated weighting grid to values at the sixteen nearby locations, the rotated weighting grid indicating one of a square of a first weighting factor, a square of a second weighting factor, and a product of the first weighting factor and the second weighting factor.

15. The interpolation system of claim 12, wherein the interpolation filter further includes:

fourth color data production logic configured to generate fourth color data by subtracting second interpolated color data from the first color data, the fourth color production logic configured to provide the fourth color data to the adaptive bi-cubic spline interpolation logic to produce interpolated fourth color data; and interpolated first color data production logic configured to receive the interpolated fourth color data from the adaptive bi-cubic spline interpolation logic and to add the second color data to generate interpolated first color data.

16. The interpolation system of claim 15, wherein the interpolation filter further includes fifth color data production logic configured to generate fifth color data by subtracting third interpolated color data from the first color data, the fifth color production logic configured to provide the fifth color data to the adaptive bi-cubic spline interpolation logic to produce interpolated fifth color data, and wherein the interpolated first color data production logic is further configured to receive the interpolated fifth color data from the adaptive bi-cubic spline interpolation logic and to add the third color data to generate interpolated first color data at locations corresponding to the third color.

17. The interpolation system of claim 12, wherein the input image data includes Bayer mosaic data, and further comprising:

a first difference channel coupled to receive interpolated first color data from the interpolation filter and configured to provide first difference channel output data corresponding to the second color; and a second difference channel coupled to receive the interpolated first color data from the interpolation filter and configured to provide second difference channel output data corresponding to the third color, wherein the interpolated first color data, the first difference channel output data, and the second difference channel output data provide a result of a demosaicing operation on the input image data.

18. A method comprising:

receiving image data including first color data representing a first color, second color data representing a second color, and third color data representing a third color, the image data including more of the first color data than the second color data and the third color data;

generating fourth color data that represents a fourth color by subtracting interpolated second color data from the first color data;

interpolating the fourth color data to generate interpolated fourth color data; and generating interpolated first color data using the interpolated fourth color data added to the second color data.

19. The method of claim 18, wherein the fourth color is yellow, cyan, red, or blue.

20. The method of claim 18, further comprising:

generating fifth color data that represents a fifth color by subtracting interpolated fifth color data from the first color data;

interpolating the fifth color data to generate interpolated fifth color data; and generating interpolated first color data using the interpolated fifth color data added to the third color data.

21. The method of claim 18, wherein interpolating the fourth color data includes performing an adaptive bi-cubic spline interpolation operation using sixteen nearest neighbors.

22. The method of claim 21, wherein the adaptive bi-cubic spline interpolation operation adjusts an interpolation value based on an exponentiation to a power of four of a difference of an initial value and a nearby value.

23. A processor readable medium storing processor instructions that are executable by the processor to:

receive image data including first color data representing a first color, second color data representing a second color, and third color data representing a third color;

generate interpolated second color data;

subtract the interpolated second color data from the first color data to generate fourth color data representing a fourth color;

interpolate the fourth color data to generate interpolated fourth color data using an adaptive bi-cubic spline interpolation operation;

add the second color data to the interpolated fourth color data to produce interpolated first color data; and store the interpolated first color data to a memory.

24. The processor readable medium of claim 23, wherein the processor instructions further include instructions executable by the processor to:

generate interpolated yellow data using the adaptive bi-cubic spline interpolation operation when the first color is green and the second color is red;

generate interpolated cyan data using the adaptive bi-cubic spline interpolation operation when the first color is green and the second color is blue;

generate interpolated red data using the adaptive bi-cubic spline interpolation operation when the first color is yellow and the second color is magenta; and generate interpolated blue data using the adaptive bi-cubic spline interpolation operation when the first color is yellow and the second color is cyan.

25. The processor readable medium of claim 24, wherein the adaptive bi-cubic spline interpolation operation applies a rotated weighting grid to adjust values of the fourth color data at predetermined positions relative to a particular location.

26. The processor readable medium of claim 25, wherein the adaptive bi-cubic spline interpolation operation divides each value of the fourth color at the predetermined positions by a difference between an initial value of the particular location and the value of the fourth color at the predetermined position, the difference raised to the fourth power.

* * * * *